United States Patent
Seto et al.

(10) Patent No.: US 6,772,673 B2
(45) Date of Patent: Aug. 10, 2004

(54) FLEXIBLE ACTUATOR

(75) Inventors: Takeshi Seto, Chofu (JP); Kunihiko Takagi, Okaya (JP)

(73) Assignee: Seiko Epson Corporation, Tokyo (JP)

(*) Notice: Subject to any disclaimer, the term of this patent is extended or adjusted under 35 U.S.C. 154(b) by 96 days.

(21) Appl. No.: 10/295,890

(22) Filed: Nov. 18, 2002

(65) Prior Publication Data

US 2003/0110938 A1 Jun. 19, 2003

(30) Foreign Application Priority Data

Dec. 13, 2001 (JP) .......................... 2001-380233
Dec. 13, 2001 (JP) .......................... 2001-380234
May 30, 2002 (JP) .......................... 2002-157103

(51) Int. Cl.[7] .............................................. F15B 15/10
(52) U.S. Cl. ................................................... 92/92
(58) Field of Search ............................... 92/92, 91, 90, 92/137, 64, 42, 47

(56) References Cited

U.S. PATENT DOCUMENTS

| 3,284,964 A | | 11/1966 | Saito | |
| 3,601,442 A | * | 8/1971 | Orndorff | 92/92 |
| 4,777,868 A | * | 10/1988 | Larsson | 92/47 |
| 4,784,042 A | * | 11/1988 | Paynter | 92/92 |
| 5,251,538 A | * | 10/1993 | Smith | 92/92 |
| 6,178,872 B1 | * | 1/2001 | Schulz | 92/92 |

FOREIGN PATENT DOCUMENTS

| JP | A 2-17204 | 1/1990 |
| JP | A 5-164112 | 6/1993 |
| JP | A 5-172118 | 7/1993 |
| JP | A 2000-51289 | 2/2000 |
| WO | WO 90/15697 | 12/1990 |
| WO | WO 98/03398 | 1/1998 |
| WO | WO 01/72479 A1 | 4/2001 |

\* cited by examiner

Primary Examiner—Thomas E. Lazo
(74) Attorney, Agent, or Firm—Oliff & Berridge, PLC

(57) ABSTRACT

A flexible actuator 2 according to the invention includes a movable part 6, an actuator body 8, a reservoir 10, and a pump 12 that moves a liquid between the reservoir 10 and a main liquid chamber 4. The movable part 6 includes a long tube 16 that forms the main liquid chamber, frame members 18a, 18b . . . aligned at predetermined intervals along a length of the tube, and a core member 20 that holds the alignment of the frame members. The tube includes a narrow hollow portion 24 that communicates between flat expanded hollow portions 22a, 22b . . . . Among the plurality of expanded hollow portions, the expanded hollow portion at a base has a largest transverse cross sectional area, with transverse cross sectional areas of the expanded hollow portions gradually decreasing toward a tip, and the expanded hollow portion at the tip has a smallest transverse cross sectional area.

23 Claims, 17 Drawing Sheets

FLEXIBLE ACTUATOR

BACKGROUND OF THE INVENTION

1. Field of the Invention

The present invention relates to a flexible actuator that can be used for driving a robot capable of gripping, pinching, or pushing and a pet robot that acts like an animal.

2. Description of the Related Art

As described in Japanese Patent Laid-Open No. 5-172118 and Japanese Patent Laid-Open No. 5-164112, known actuators for gripping an object include a cylindrical elastic body having a plurality of pressure chambers therein and adjust a fluid pressure applied to each pressure chamber to curve and deform the cylindrical elastic body (hereinafter referred to as the first prior art).

Further, as described in Japanese Patent Laid-Open No. 2-17204, an actuator different from the first prior art is also known in which a driving source and a pump are integrated into a hydraulic cylinder (hereinafter referred to as the second prior art).

An actuator that operates as a robot finger of a robot must bend like a human finger, and enclose to grip a soft object such as a fruit or a paper cup, pinch a small object such as a screw with its tip, or bend to push a switch with its tip. In gripping the paper cup with the entire robot finger, a substantially even bending force is desirably produced throughout the finger. On the other hand, in pinching the object with the tip, a bending force proportional to a distance from the tip is desirably produced in terms of moment. Reducing the bending force at the tip saves power for bending.

However, in the first prior art, the actuator entirely bends with a predetermined curvature to grip the object, and do not have a structure in which an appropriate bending force is produced at each part. Thus, it is difficult to configure an actuator capable of performing various operations such as enclosing to grip the soft object, pinching the small object, or pushing the switch with the tip, with appropriate gripping forces like the human finger.

The second prior art is of the piston type, and requires many actuators and associated sensors or mechanisms to configure a flexible actuator, so that it is difficult to cause the actuator to operate as a robot finger.

Even if the actuators according to the first prior art and the second prior art are to be manufactured as pet robots that finely act like animals, many sensors and complex mechanisms must be provided to cause complex appearances.

Further, in the first prior art and the second prior art, an operating fluid must be supplied to the pressure chamber, or a pump that discharges the operating fluid from the pressure chamber must be placed outside via a fluid tube (referred to as an operating tube in the specification of the prior art) which cannot provide a small actuator. Thus, it is difficult to use the actuator as the pet robot that finely acts like an animal.

When a liquid is used as the operating fluid of the first prior art and the second prior art, a reservoir that stores the liquid is placed outside together with the pump. Between when the reservoir is above the pressure chamber (hereinafter referred to as a main liquid chamber) and when the reservoir is below the main liquid chamber, amounts of liquid supplied and discharged to and from the main liquid chamber by gravity change depending on changes in positions of the cylindrical elastic body. Thus, each change in the position of the cylindrical elastic body tends to cause a change in an amount of bending deformation.

The present invention has been achieved to solve the above described problems in the prior art, and has an object to provide a flexible actuator capable of gripping a soft object like a human finger and finely acting like an animal, and also avoiding a change in an amount of liquid moving between a reservoir and a main liquid chamber by gravity even if a liquid is used as an operating fluid, and keeping a constant amount of bending deformation even if the actuator changes its position.

SUMMARY OF THE INVENTION

To solve the problems, a flexible actuator according to the invention has the following configuration. Specifically, the flexible actuator according to the invention includes: a long movable part that is bent by a liquid moving toward a main liquid chamber; a reservoir where the liquid moves to and from the main liquid chamber; a pump that moves the liquid between the reservoir and the main liquid chamber; and a pump driving unit that controls the pump, wherein the movable part includes a long tube that forms the main liquid chamber, a plurality of frame members aligned at predetermined intervals along a length of the tube, and a resilient core member that holds the alignment of the frame members, the tube is made of a flexible elastic material, and includes a plurality of flat expanded hollow portions provided at predetermined intervals along the length and a narrow hollow portion that communicates between the expanded hollow portions, the plurality of frame members are formed by flat members and longitudinally hold the plurality of expanded hollow portions by the narrow hollow portion of the tube inserted into recesses or holes provided on sides abutting the core member, the movable part has a first bending portion that produces a large bending force and a second bending portion that produces a small bending force, the expanded hollow portion placed in the first bending portion has a large transverse cross sectional area, and the expanded hollow portion placed in the second bending portion has a small transverse cross sectional area.

According to the invention, the expanded hollow portion placed in the first bending portion has the large transverse cross sectional area, and the expanded hollow portion placed in the second bending portion has the small transverse cross sectional area, so that the first bending portion produces the large bending force and the second bending portion produces the small bending force simply by a fluid flowing into the tube to increase capacities of the expanded hollow portions, thus allowing operations different from those of a conventional actuator.

The flexible actuator may be used as a robot finger or the like, and the expanded hollow portion at a base of the movable part as the first bending portion may have a largest transverse cross sectional area, with transverse cross sectional areas of the expanded hollow portions gradually decreasing toward a tip of the movable part, and the expanded hollow portion at the tip of the movable part as the second bending portion may have a smallest transverse cross sectional area.

When the flexible actuator with such a configuration is used as the robot finger, the base of the movable part that is a root of the robot finger produces a large bending force, and the tip of the movable part that is a tip of the robot finger produces a small bending force to bend. This allows the actuator to reliably enclose to grip a soft object, pinch a small object, or push a switch with the tip, and act like a human finger.

The transverse cross sectional area of the expanded hollow portion placed in the second bending portion may be 30% to 80% of the transverse cross sectional area of the expanded hollow portion placed in the first bending portion.

In this way, providing the second bending portion at the base prevents a large force to fold the base from being applied in gripping the object, thus allowing the object to be properly gripped. Further, an average sectional area at the tip that requires no large bending force is small, thus a total amount of hydraulic fluid required for bending decreases to allow quick bending and extension.

The core member may be a member having gradually decreasing resilience from the base toward the tip of the movable part. Alternatively, the core member may be a tapered plate material in which a base has a large width, with widths gradually decreasing toward a tip, and the tip has a smallest width.

This exerts no influence on bending displacement of the movable part. When the movable part bends under a no-load or light-load condition, the core member having the large width at the base prevents the bending force from concentrating on the base of the movable part, thus allowing the entire movable part to bend with an even curvature.

The flexible actuator may be used as an actuator for massaging a shoulder, and the expanded hollow portion at a center along the length of the movable part as the first bending portion has a largest transverse cross sectional area, with transverse cross sectional areas of the expanded hollow portions gradually decreasing toward both ends along the length of the movable part, and the expanded hollow portions at the both ends of the movable part as the second bending portion have a smallest transverse cross sectional area.

When the flexible actuator with such a configuration is used as the actuator for massaging a shoulder by being applied to a human shoulder, a bending force of the expanded hollow portion at the center along the length increases to ensure massaging the shoulder.

The transverse cross sectional area of the expanded hollow portion placed in the second bending portion may be approximately 60% of the transverse cross sectional area of the expanded hollow portion placed in the first bending portion.

In this way, the bending force of the first bending portion that requires a large bending force in operation such as pinching increases and concentrates since the second bending portion requires a small bending force and a reduced amount of hydraulic fluid, thus providing quick shoulder massage.

The core member may be a member having gradually decreasing resilience from the center along the length toward the both ends of the movable part. Alternatively, the core member may be a plate material in which a center along a length has a large width, with widths gradually decreasing toward both ends, and the both ends have a smallest width.

In this way, the core member has low resilience at a portion where the moving part produces a small bending force. Thus, there can be provided an actuator for massaging a shoulder capable of enclosing the entire shoulder for massaging with a constant curvature in massaging with a small force.

There may be provided a flexible actuator including: a long movable part that is bent by a liquid moving toward a main liquid chamber; a reservoir where the liquid moves to and from the main liquid chamber; a pump that moves the liquid between the reservoir and the main liquid chamber; and a pump driving unit that controls the pump, wherein the movable part includes the main liquid chamber and the reservoir placed along a length, a plurality of frame members aligned at predetermined intervals along lengths of the main liquid chamber and the reservoir, and a resilient core member that holds the alignment of the frame members. The main liquid chamber and the reservoir are placed along a length in the movable part, so that even if a position of the movable part changes, an amount of fluid supplied from the reservoir to the main liquid chamber, and an amount of fluid discharged from the main liquid chamber to the reservoir by gravity do not change. Therefore, the change in the position of the movable part causes no change in an amount of bending deformation of the pump driving unit. The main liquid chamber and the reservoir are placed along the length to provide a small actuator.

The reservoir may be formed by a tube made of an expandable and shrinkable elastic material, and includes a plurality of flat expanded hollow portions provided at predetermined intervals along the length, and a narrow hollow portion that communicates between the expanded hollow portions.

This allows a plurality of reservoirs to be connected by a tube to configure one reservoir with a large capacity and a simple structure, thus providing an inexpensive actuator.

The main liquid chamber may be formed by a tube made of an expandable and shrinkable elastic material, and includes a plurality of flat expanded hollow portions provided at predetermined intervals along the length, and a narrow hollow portion that communicates between the expanded hollow portions, and each expanded hollow portion of the main liquid chamber may be placed to longitudinally overlap each expanded hollow portion of the reservoir. This provides a smaller actuator.

The plurality of frame members may be hollow members with cavities therein, and the expanded hollow portions of the reservoir may be placed in the cavities of the plurality of frame members.

This provides a small actuator with a short length. Each expanded hollow portion of the reservoir is placed in each cavity of the frame members, thus the fluid stored in the expanded hollow portions of the reservoir is not influenced by pressure due to bending of the movable part.

The tube that forms the reservoir may be made of a flexible elastic material such that each expanded hollow portion of the tube can expand into the entire cavity.

This allows a space in the cavity of the frame member to be effectively used as the reservoir, thus providing a small actuator.

The plurality of frame members may include air holes that communicate between the cavities and an outside.

This allows the air in the cavity to pass through the air hole to the outside when the expanded hollow portion of the tube that forms the reservoir expands into the cavity of the frame member. Thus, the air in the cavity exerts no influence on expansion of the expanded hollow portion of the tube that forms the reservoir.

The pump may be built in an actuator body integral with an end of the movable part. In this case, the pump is built in the actuator body to be compact, thus the actuator can be used as a pet robot with a simple appearance.

A sensor that detects the amount of moving fluid may be placed in any of the pump, the main liquid chamber, or the reservoir, and the pump driving unit may control the pump based on information from the sensor.

This allows control of the movable part with high accuracy, and for example, causes fine acting like an animal when the actuator is used as the pet robot.

There may be provided a flexible actuator including: a plurality of flat expanded hollow portions made of a flexible elastic material and provided at predetermined intervals along a length; a long tube in which a liquid chamber is formed by a connection tube that communicates between the plurality of expanded hollow portions and extends along the length; a plurality of flat frame members that longitudinally hold the plurality of expanded hollow portions of the tube with surface contact; and a connection that holds the adjacent frame members so as to swing against each other, wherein the actuator further includes at least one spring member for recovering rotating angle between the frame members, and the spring member is placed to produce a spring force in a compressing direction of the expanded hollow portions of the tube by the adjacent frame members.

In this case, the actuator includes at least one spring member for recovering the rotating angle between the frame members, so that the spring member produces the spring force in the compressing direction of the plurality of expanded hollow portions to return the fluid from the tube, thus recovering to an upright condition. Further, the spring member is independent, thus facilitating adjusting the resilience to minimize repulsion in large bending due to the resilience.

There may be provided a flexible actuator including: a first actuator that bends in a predetermined direction; and a second actuator joined to a base of the first actuator, wherein the first actuator includes: a plurality of flat expanded hollow portions made of a flexible elastic material and provided at predetermined intervals along a length; a long tube in which a liquid chamber is formed by a connection tube that communicates between the plurality of expanded hollow portions and extends along the length; a plurality of flat frame members that longitudinally hold the plurality of expanded hollow portions of the tube with surface contact; and a connection that holds the adjacent frame members so as to swing against each other, and the second actuator is placed between the frame member at the base of the first actuator and an actuator mounting portion, and the entire first actuator is slanted in a direction different from a bending direction of the first actuator.

In this way, the first actuator that bends in a predetermined direction, and the second actuator that slants the entire first actuator in the direction different from the bending direction of the first actuator are provided, thus allowing a position of a tip frame member corresponding to the finger tip to be changed when the actuator is used as a robot finger of a robot to precisely grip a small object.

The first actuator may include at least one spring member for recovering rotating angle between the frame members, and the spring member may be placed to produce a spring force in a compressing direction of the expanded hollow portions of the tube by the adjacent frame members. In this case, the spring member produces the spring force in the compressing direction of the plurality of expanded hollow portion to return the fluid from the tube, thus recovering to the upright position. Further, the spring member of the first actuator is independent, thus facilitating adjusting the resilience to minimize repulsion in large bending due to the resilience.

Further, ends of the spring member may be secured to both ends of the aligned frame members. Thus, even in a local and deep bending condition, the spring member does not locally and excessively extend to increase durability.

Each of the frame members may include a guide that guides extension and shrinkage of the spring member. This prevents the spring member from being shifted in bending the flexible actuator.

The frame members and the connection may be integrally molded of resin. This provides a flexible actuator that includes a small number of components, has a reduced weight, and is easy to assemble.

DETAILED DESCRIPTION OF THE PREFERRED EMBODIMENTS

Embodiments of a flexible actuator according to the invention will be described below with reference to the accompanying drawings.

Figure 1:
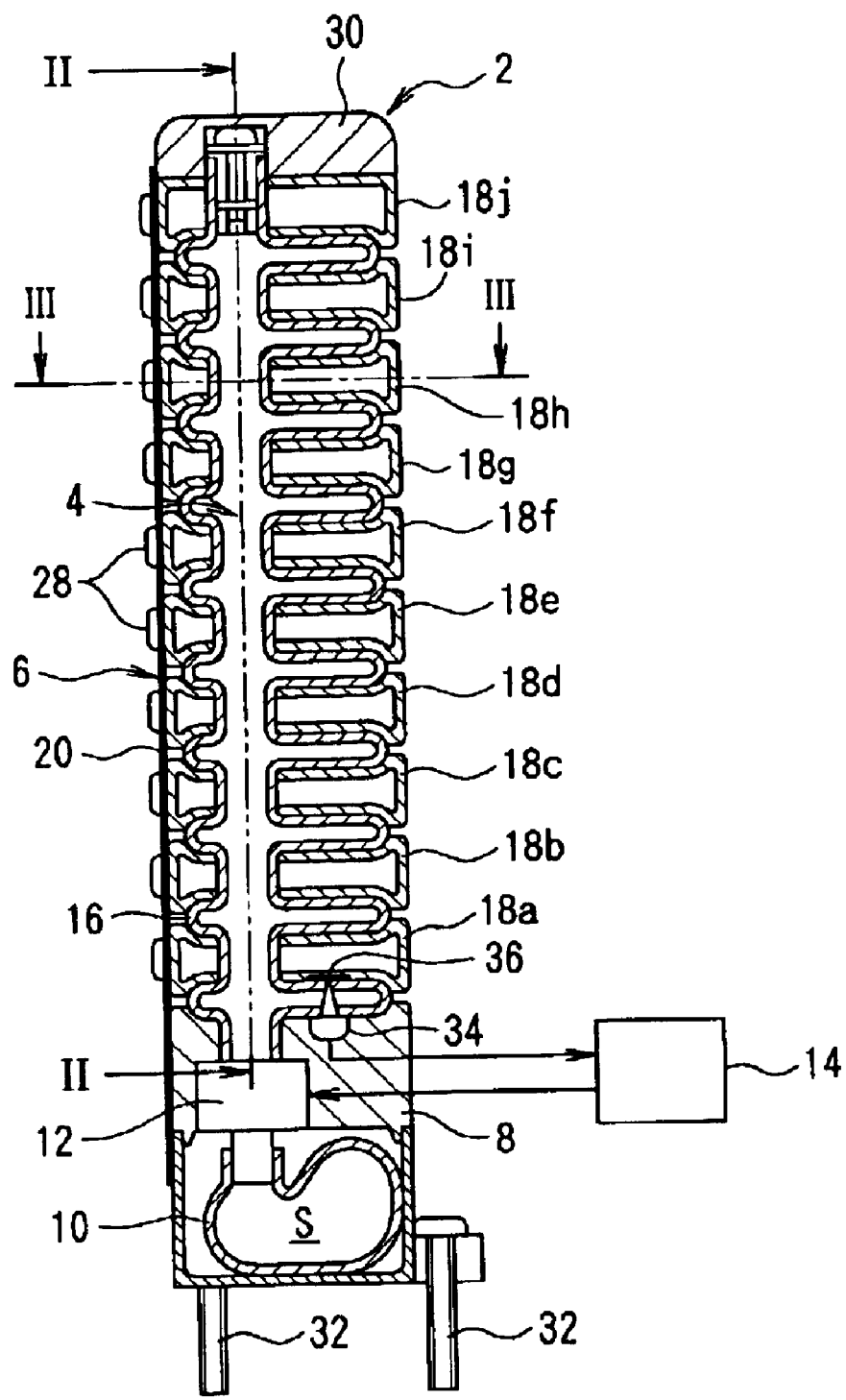
FIG. 1 is a vertical sectional view of a flexible actuator used as a robot finger according to a first embodiment of the invention.

FIG. 1 shows a flexible actuator 2 used as a robot finger of a robot according to a first embodiment.

The flexible actuator 2 includes a long movable part 6 that is bent by a liquid moving toward a main liquid chamber 4, an actuator body 8 integral with a base of the movable part 6, a reservoir 10 that is built in the actuator body 8 and where a liquid moves to and from the main liquid chamber 4, a pump 12 that moves the liquid between the reservoir 10 and the main liquid chamber 4, and a pump driving unit 14 that controls the pump 12. The actuator body 8 is a root of the robot finger and secured to a hand of the unshown robot.

The movable part 6 includes a long tube 16 that forms the main liquid chamber 4, a plurality of frame members 18a, 18b . . . aligned at predetermined intervals along a length of the tube 16, and a core member 20 that holds the alignment of the frame members 18a, 18b . . . .

Figure 2:
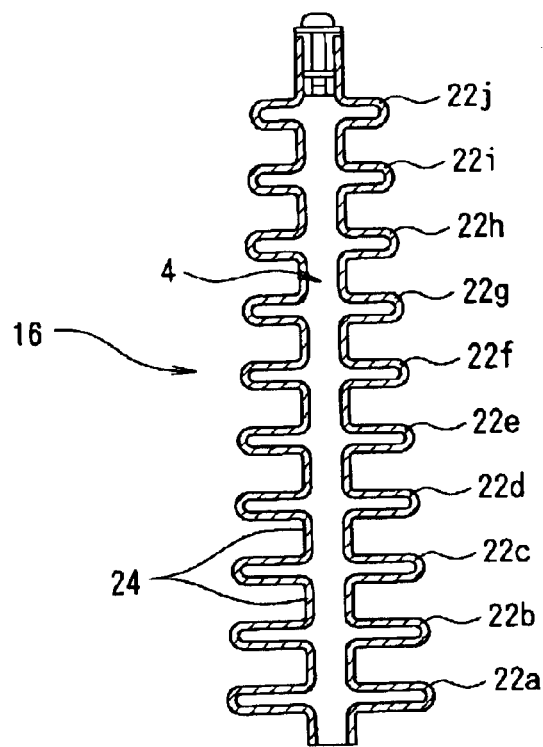
FIG. 2 is a view taken along line II—II in FIG. 1 as seen in the direction of the arrow, and shows a tube that is a component of the first embodiment.

The tube 16 is made of a flexible translucent elastic material of synthetic resin. FIG. 2 shows a section of the tube 16 in FIG. 1 in a direction perpendicular to the drawing sheet (II—II in FIG. 1). As apparent from FIG. 2, the tube 16 has a fernlike appearance in which a narrow hollow portion 24 communicates between flat expanded hollow portions 22a, 22b . . . provided at predetermined intervals along the length.

Figure 3:
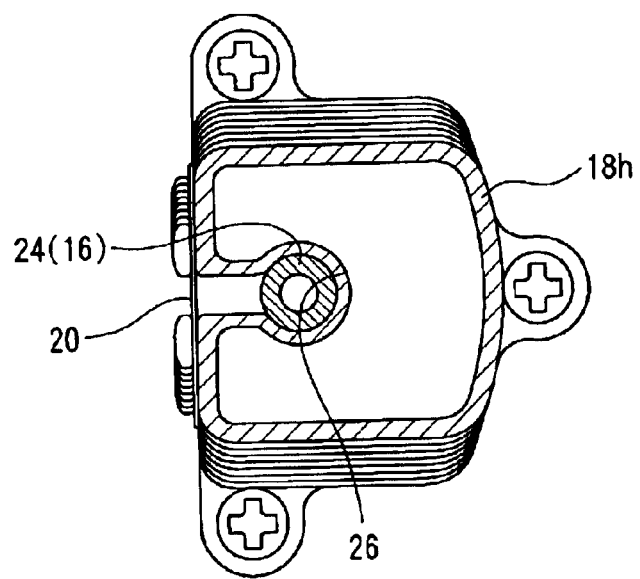
FIG. 3 is a view taken along line III—III in FIG. 1 as seen in the direction of the arrow.

The plurality of frame members 18a, 18b . . . are substantially rectangular hollow members on plane view made of synthetic resin. A frame member 18h in FIG. 3 has a recess 26 provided on a side abutting the core member 20, into which the narrow hollow portion 24 of the tube 16 is inserted, and is vertically held between expanded hollow portions 22h, 22i . . . of the tube 16. The frame members 18a, 18b . . . other than the frame member 18h also have recesses 26, into which the narrow hollow portion 24 of the tube 16 is inserted, and are vertically held between the expanded hollow portions 22a, 22b . . . of the tube 16. On a frame member 18j at the top, a cap 30 made of synthetic resin or the like is placed.

Among the expanded hollow portions 22a, 22b . . . of the tube 16, the expanded hollow portion 22a at abase has a largest transverse cross sectional area, expanded hollow portions 22b, 22c . . . toward a tip have gradually decreasing transverse cross sectional areas, and an expanded hollow portion 22j at the tip has a smallest transverse cross sectional area. The base of the movable part 6 where the expanded hollow portion 22a is positioned corresponds to a first bending portion of the invention, and the tip of the movable part 6 where the expanded hollow portion 22j is positioned corresponds to a second bending portion of the invention.

Similarly, among the plurality of frame members 18a, 18b . . . , the frame member 18a at a base has a largest transverse cross sectional area, frame members 18b, 18c . . . toward a tip have gradually decreasing transverse cross sectional areas, and a frame member 18j at the tip has a smallest transverse cross sectional area.

Figure 4:
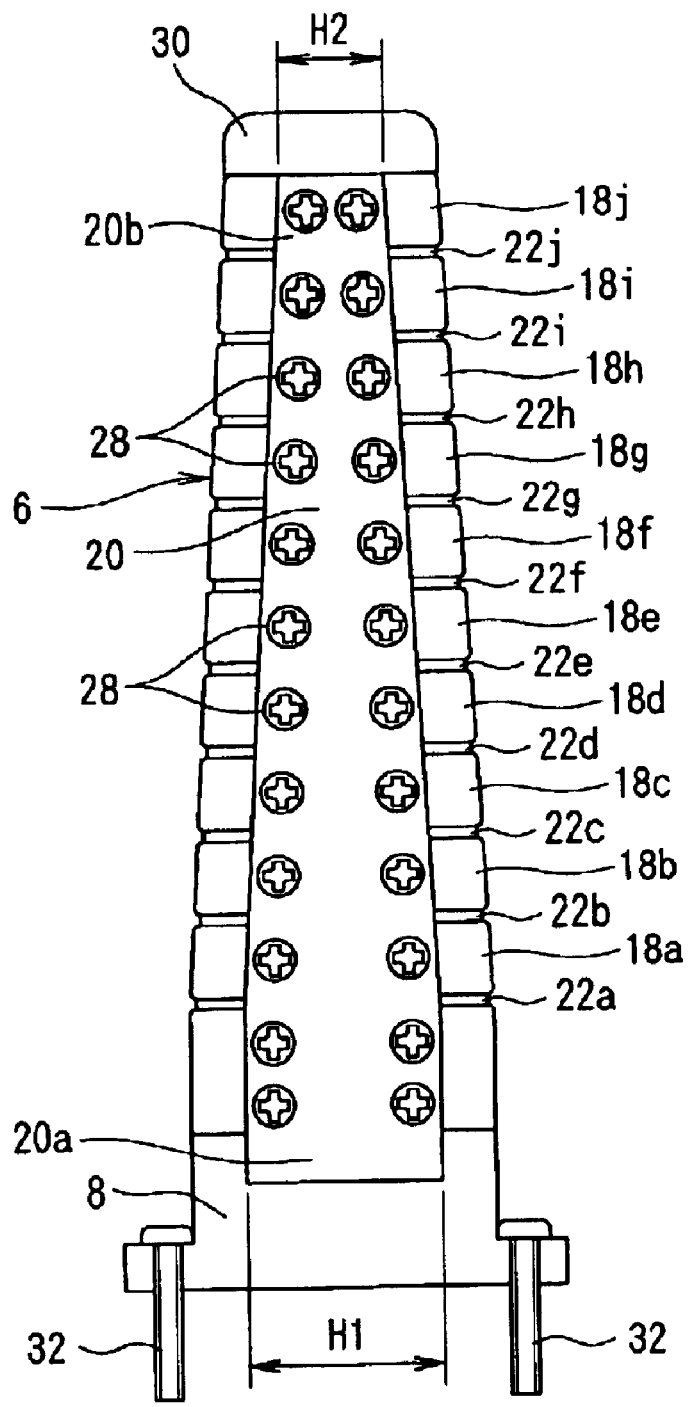
FIG. 4 shows the flexible actuator according to the first embodiment seen from a core member side.

As shown in FIG. 4, the core member 20 is an elastic deformable plate member made of synthetic resin, vertically secures the frame members 18a, 18b . . . with spaces therebetween using a plurality of screws 28, and is secured at its bottom to the actuator body 8. A tapered plate member is used as the core member 20 in which a base 20a has a large width H1, with widths decreasing toward a tip 20b, and the tip 20b has a smallest width H2. A sheet flexible material (not shown) is attached to the entire surface of the core member 20 with the screws 28.

The transverse cross sectional area of the expanded hollow portion 22j at the tip is 30% to 80% of the transverse cross sectional area of the expanded hollow portion 22a at the base.

The actuator body 8 is secured to the hand of the robot by securing screws 32. The pump 12 built in the actuator body 8 uses, for example, a piezo type diaphragm pump, and connects to a bottom opening of the tube 16 and the reservoir 10 that stores a predetermined amount of hydraulic fluid S such as liquid silicone. The pump 12 supplies the hydraulic fluid S in the reservoir 10 to the tube 16, or returns the hydraulic fluid S in the tube 16 to the reservoir 10 by controlling the pump driving unit 14.

The actuator body 8 includes a light receiving and emitting unit 34 having a light emitting element such as a light emitting diode and a light receiving element such as a photodiode. A reflection unit 36 such as a mirror is provided on a lower surface of the frame member 18a at the bottom facing the light receiving and emitting unit 34 via the expanded hollow portion 22a of the tube 16. The light receiving and emitting unit 34 sends detected information on an amount of emitted light (an amount of received light) toward (from) the reflection unit 36 to the pump driving unit 14 as required.

The pump driving unit 14 includes an input interface circuit for reading a detected signal from the light receiving and emitting unit 34, a processing unit that performs predetermined processing for controlling the pump 12 according to a predetermined program, a storage unit such as a RAM or a ROM, and an output interface circuit that outputs a voltage control signal to a piezo element or the like of the piezo type diaphragm pump obtained by the processing unit. The storage unit stores a storage table for estimating an amount of displacement of the movable part 6 from both values of a change in hydraulic pressure of the main liquid chamber 4 of the tube 16 and a change in the amount of received light input from the light receiving and emitting unit 34. The processing unit performs the predetermined processing for controlling the pump 12 with reference to the storage table.

Figure 5:
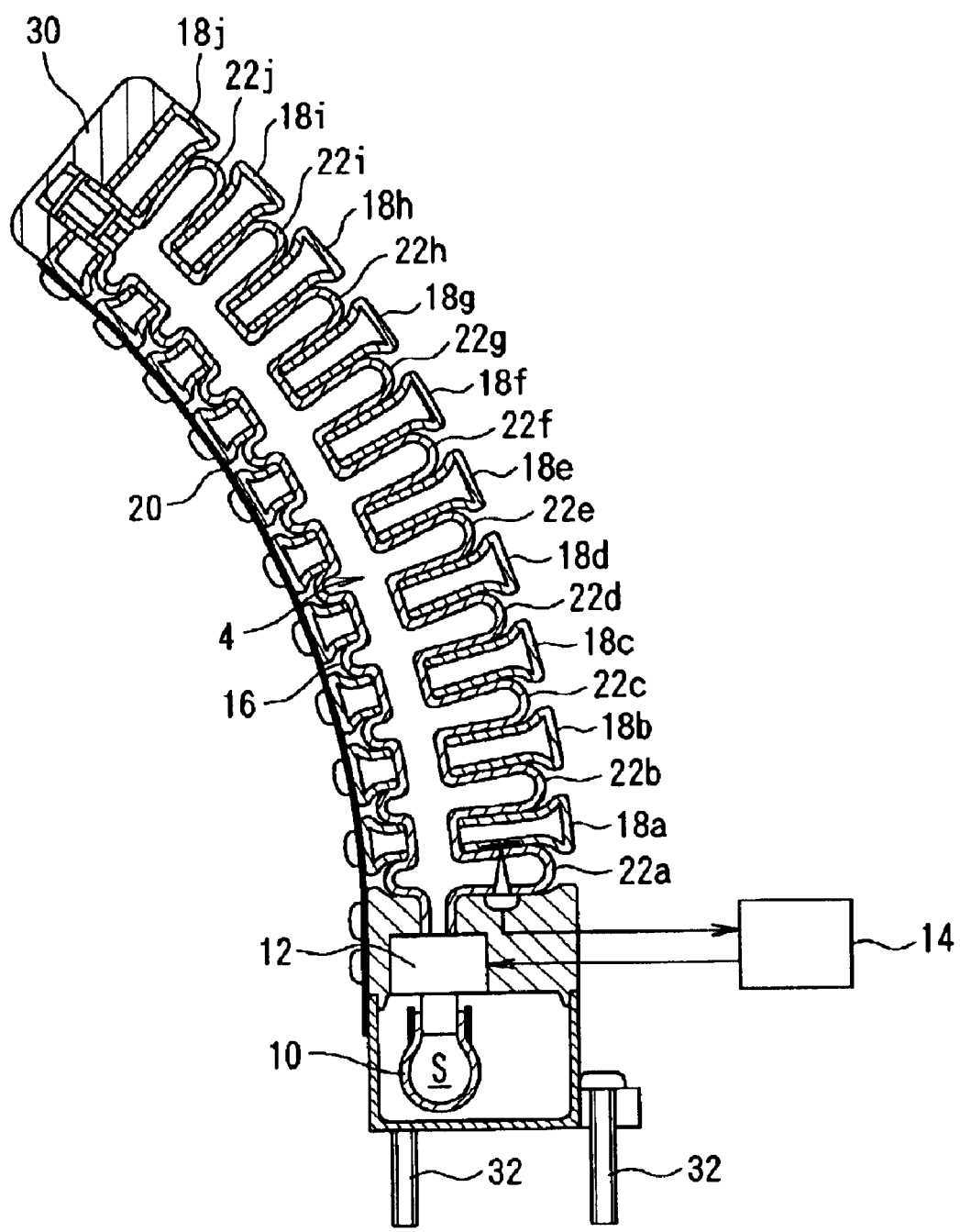
FIG. 5 shows the flexible actuator according to the first embodiment being bent.

Next, operations of the flexible actuator 2 having the above described configuration will be described with reference to FIG. 5.

A control current is output from the pump driving unit 14 to the pump 12. When the pump 12 supplies the hydraulic fluid S in the reservoir 10 to the tube 16 (main liquid chamber 4), the hydraulic fluid S flows into the expanded hollow portions 22a, 22b . . . of the tube 16 to increase their capacities.

The expanded hollow portions 22a, 22b . . . with the increased capacities by the hydraulic fluid S flowing into the tube 16 (main liquid chamber 4) bend the core member 20 to displace the frame members 18a, 18b . . . .

At this time, among the expanded hollow portions 22a, 22b . . . , the expanded hollow portion 22a at the base has the largest transverse cross sectional area, and the expanded hollow portion 22j at the tip has the smallest transverse cross sectional area, with the transverse cross sectional areas gradually decreasing from the base toward the tip. Thus, the expanded hollow portion 22a at the base produces a larger force to bend the core member 20 (hereinafter referred to as a bending force) than any other expanded hollow portions. Other expanded hollow portions 22b, 22c . . . 22j have the gradually decreasing transverse cross sectional areas, so that bending forces decrease toward the tip (toward the expanded hollow portion 22j), and the expanded hollow portion 22j at the tip produces a smallest bending force.

As the core member 20 that vertically secures the frame members 18a, 18b with spaces therebetween is bent, a force to return to an upright condition (hereinafter referred to as resilience) gradually increases to cause resilience against bending displacement of the expanded hollow portions 22a, 22b .... The core member 20 of this embodiment is tapered such that the base 20a has the large width H1, with the widths decreasing toward the tip 20b, and the tip has the smallest width H2. The resilience gradually decreases with the increasing amount of bending displacement toward the expanded hollow portion 22j at the tip, thus the bending force and the resilience decreasing toward the tip are balanced, and the entire movable part 6 bends with a substantially even curvature under a no-load condition. Also in gently gripping a soft object such as a paper cup, the actuator can evenly grip the entire object without local bending.

When the cap 30 corresponding to the tip of the robot finger pinches to turn a screw, the cap 30 has to produce a large force. A reaction force of this action is proportional to a distance from the cap 30, thus the bending force of the actuator is desirably larger at the base than the tip. When the actuator of the invention produces a bending force higher than a certain level, the resilience has relatively less influence, and the difference in the transverse cross sectional areas of the expanded hollow portions 22a, 22b ... provides the bending force larger at the base than the tip. This allows stable pinching without increased curvature only at the tip.

The transverse cross sectional area of the expanded hollow portion 22j at the tip is 30% or more of the transverse cross sectional area of the expanded hollow portion 22a at the base, thus in gripping a soft circular object, the movable part 6 does not locally bend but bends along the circular object with the same curvature to grip the object with an even force. Also, the transverse cross sectional area of the expanded hollow portion 22j at the tip is 80% or less of the transverse cross sectional area of the expanded hollow portion 22a at the base, thus in gripping an object, a large force by reaction of the gripping is not applied to the base to normally grip the object.

An average transverse cross sectional area of the expanded hollow portions 22j, 22i, 22h ... at the tip that require no large bending force is small, thus a total amount of hydraulic fluid S required for bending decreases to allow quick bending.

When the pump 12 returns the hydraulic fluid S in the tube 16 (main liquid chamber 4) to the reservoir 10, the capacities of the expanded hollow portions 22a, 22b of the tube 16 decrease, and the resilience of the core member 20 causes the frame members 18a, 18b ... to return to their original positions. This brings the flexible actuator 2 into an upright condition as shown in FIG. 1. At this time, the expanded hollow portions 22j, 22i, 22h at the tip having the small transverse cross sectional areas reduce the capacity of the entire main liquid chamber. Thus, the capacity decreases in a short time, and the flexible actuator 2 is brought into the upright condition in a short time.

Therefore, according to the flexible actuator 2 of this embodiment, when the hydraulic fluid S flows into the tube 16 to increase the capacities of the expanded hollow portions 22a, 22b..., the entire actuator bends with the substantially even curvature in gently gripping the soft object, thus allowing enclosing to grip the soft object. In pinching the small object, or pushing a switch with the tip, a bending force corresponding to moment from the tip is caused to prevent the finger tip only from being bending, thus ensuring operation and allowing use as the robot finger that acts like a human finger.

Also when the movable part 6 bends under the no-load condition, the core member 20 having the large width at the base 20a prevents the bending force from concentrating on the base of the movable part 6. Thus, the entire movable part 6 bends with the even curvature to act like the human finger.

The pump 12 that moves the liquid between the main liquid chamber 4 (in the tube 16) and the reservoir 10 is built in the actuator body 8 integral with the base of the movable part 6, the actuator body 8 includes the light receiving and emitting unit 34, the reflection unit 36 is provided on the frame member 18a at the bottom facing the light receiving and emitting unit 34 via the expanded hollow portion 22a of the tube 16. Thus, a driving unit (the pump 12) and a sensor unit (the light receiving and emitting unit 34 and the reflection unit 36) become compact to provide the robot finger with a simple appearance.

Further, the pump 12 is activated to increase or decrease the capacities of the expanded hollow portions 22a, 22b ... of the tube 16 to vertically move the frame members 18a, 18b ..., and to bend the core member 20 with the widths gradually decreasing toward the tip 20b to cause the bending displacement of the movable part 6. Thus, the movable part 6 serves as the robot finger that securely grips the object along the object.

Figure 6:
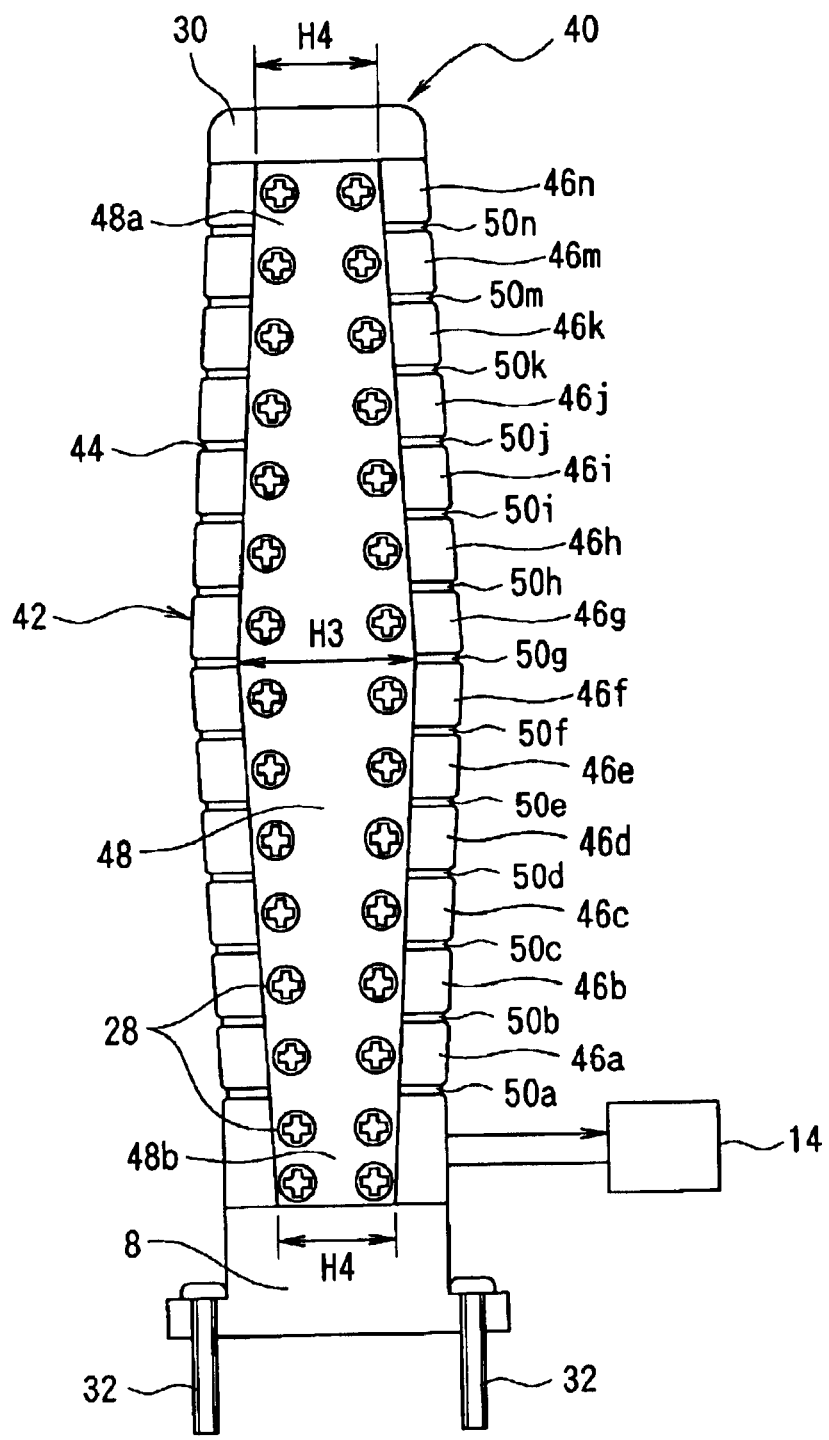
FIG. 6 shows a flexible actuator used as an actuator for massaging a shoulder according to a second embodiment seen from a core member side.
Figure 7:
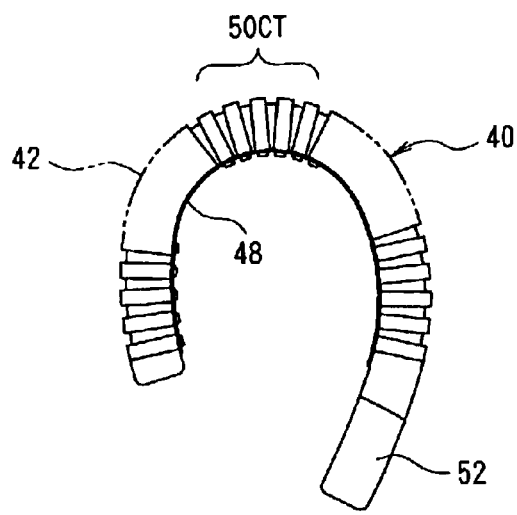
FIG. 7 shows the flexible actuator according to the second embodiment being bent.
Figure 8:
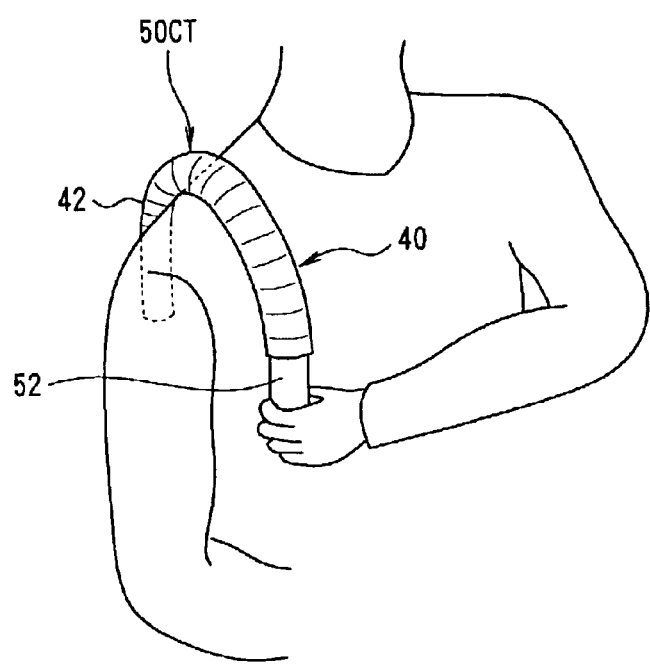
FIG. 8 shows the flexible actuator according to the second embodiment being applied to a human shoulder for massaging.

Next, FIGS. 6 to 8 show a flexible actuator 40 according to a second embodiment of the invention. Like components as in the first embodiment shown in FIGS. 1 to 5 are denoted by like reference numerals, and descriptions thereof will be omitted.

The flexible actuator 40 is used as an actuator for massaging a shoulder, and includes a movable part 42, an actuator body 8 integral with a base of the movable part 42, and a pump driving unit 14.

A reservoir 10 and a pump 12 are built in the actuator body 8.

The movable part 42 includes a long tube 44 that forms a main liquid chamber, a plurality of frame members 46a, 46b ... aligned at predetermined intervals along a length of the tube 44, and a core member 48 that holds the alignment of the frame members 46a, 46b ....

The tube 44 is made of a flexible translucent elastic material of synthetic resin, has a fernlike appearance in which a narrow hollow portion (not shown) communicates between flat expanded hollow portions 50a, 50b ... provided at predetermined intervals along the length, and has a shape like the tube 16 in the first embodiment.

The plurality of frame members 46a, 46b ... are substantially rectangular hollow members on plane view made of synthetic resin, and have shapes like the frame members 18a, 18b ... in the first embodiment.

Among the expanded hollow portions 50a, 50b ... of the tube 44, an expanded hollow portion 50g at a center along the length has a largest transverse cross sectional area, with transverse cross sectional areas gradually decreasing from the expanded hollow portion 50g toward a tip and a base, and an expanded hollow portion 50n at the tip and the expanded hollow portion 50a at the base have a smallest transverse cross sectional area. The center along the length of the movable part 42 where the expanded hollow portion 50g is positioned corresponds to a first bending portion of the invention, and the base and the tip of the movable part 42 where the expanded hollow portions 50n, 50a are positioned correspond to second bending portions of the invention.

Similarly, among the plurality of frame members 46a, 46b..., frame members 46f, 46g at a center along the length have a largest transverse cross sectional area, with sectional areas gradually decreasing from the frame members 46f, 46g toward a tip and a bottom, and a frame member 46n at the tip and a frame member 46a at the base have a smallest transverse cross sectional area.

The core member 48 is an elastic deformable plate member made of synthetic resin, vertically secures the plurality of frame members 46a, 46b . . . with spaces therebetween using a plurality of screws 28, and is secured at its bottom to the actuator body 8. The core member 48 is shaped such that a center along the length has a large width H3, with widths gradually decreasing toward a tip 48a and a base 48b, and the tip 48a and the base 48b have a smallest width H4.

The transverse cross sectional areas of the expanded hollow portion 50n at the tip and the expanded hollow portion 50a at the base are 60% of the transverse cross sectional area of the expanded hollow portion 50g at the center.

The actuator body 8 is secured to a grip 52 by securing screws 32.

Next, operations of the flexible actuator 40 having the above described configuration will be described with reference to FIG. 7.

When a control current is output from the pump driving unit 14 to the pump 12, the expanded hollow portions 50a, 50b . . . with increased capacities by a hydraulic fluid S flowing into the tube 44 bend the core member 48 to displace the frame members 46a, 46b . . . .

At this time, among the expanded hollow portions 50a, 50b . . . , the expanded hollow portion 50g at the center along the length has the largest transverse cross sectional area, with the sectional areas gradually decreasing from the expanded hollow portion 50g toward the tip and the base, and the expanded hollow portion 50n at the tip and the expanded hollow portion 50a at the base have the smallest transverse cross sectional area. Thus, the expanded hollow portions 50e, 50f, 50g, 50h (denoted by 50CT in FIG. 7) at the center along the length produce a larger bending force than any other expanded hollow portions.

Thus, the flexible actuator 40 as the actuator for massaging a shoulder is applied to a human shoulder as shown in FIG. 8 to repeat bending the movable part 42, thus increasing the bending force of the expanded hollow portion 50CT at the center along the length to ensure massaging the shoulder.

Further, the pump 12 is activated to increase or decrease the capacities of the expanded hollow portions 50a, 50b . . . to vertically move the frame members 46a, 46b . . . , and to bend the core member 48 with the width gradually decreasing toward the ends to cause bending displacement of the movable part 42. Thus, the actuator for massaging a shoulder can be provided in which even when the flexible actuator 40 pinches an object with its both ends, bending does not concentrate on the both ends.

Figure 9:
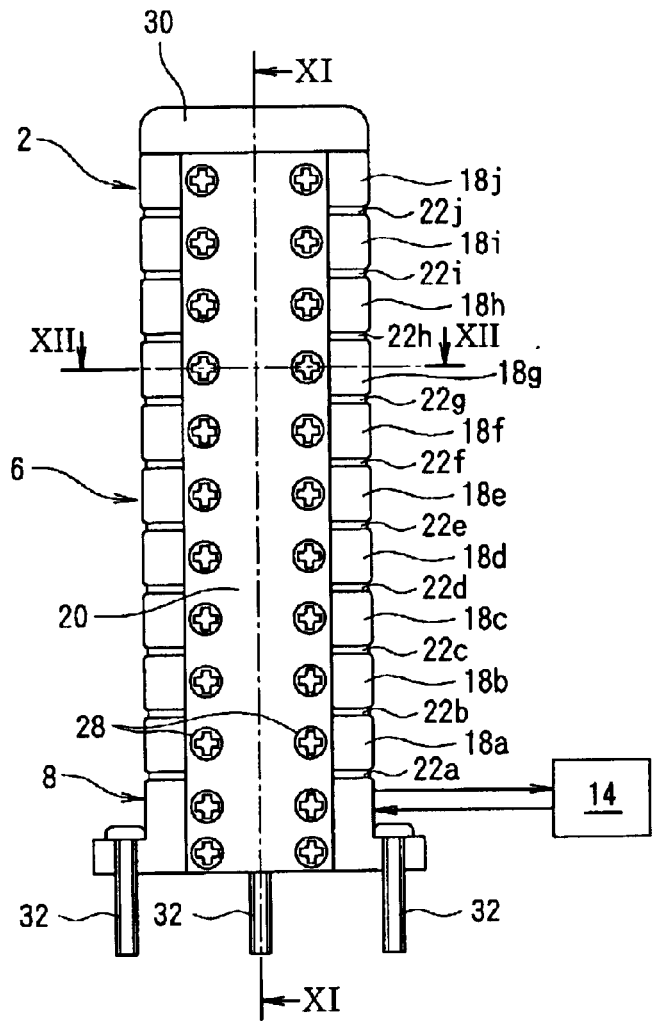
FIG. 9 shows a flexible actuator used as a robot finger according to a third embodiment of the invention seen from a core member side.
Figure 10:
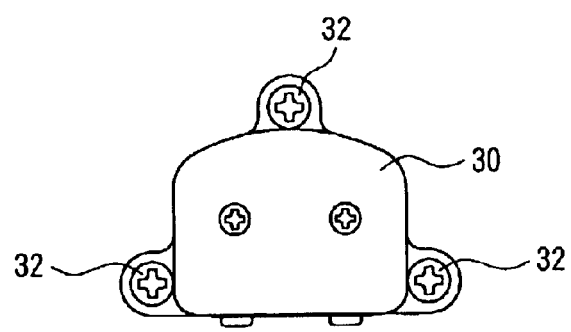
FIG. 10 is a plane view of the flexible actuator according to the third embodiment.

Next, FIG. 9 shows a flexible actuator 2 used as a robot finger of a robot according to a third embodiment. FIG. 10 is a plane view of FIG. 9, FIG. 11 is a view taken along line XI—XI in FIG. 9 as seen in the direction of the arrow, and FIG. 12 is a view taken along line XII—XII in FIG. 9 as seen in the direction of the arrow.

Figure 11:
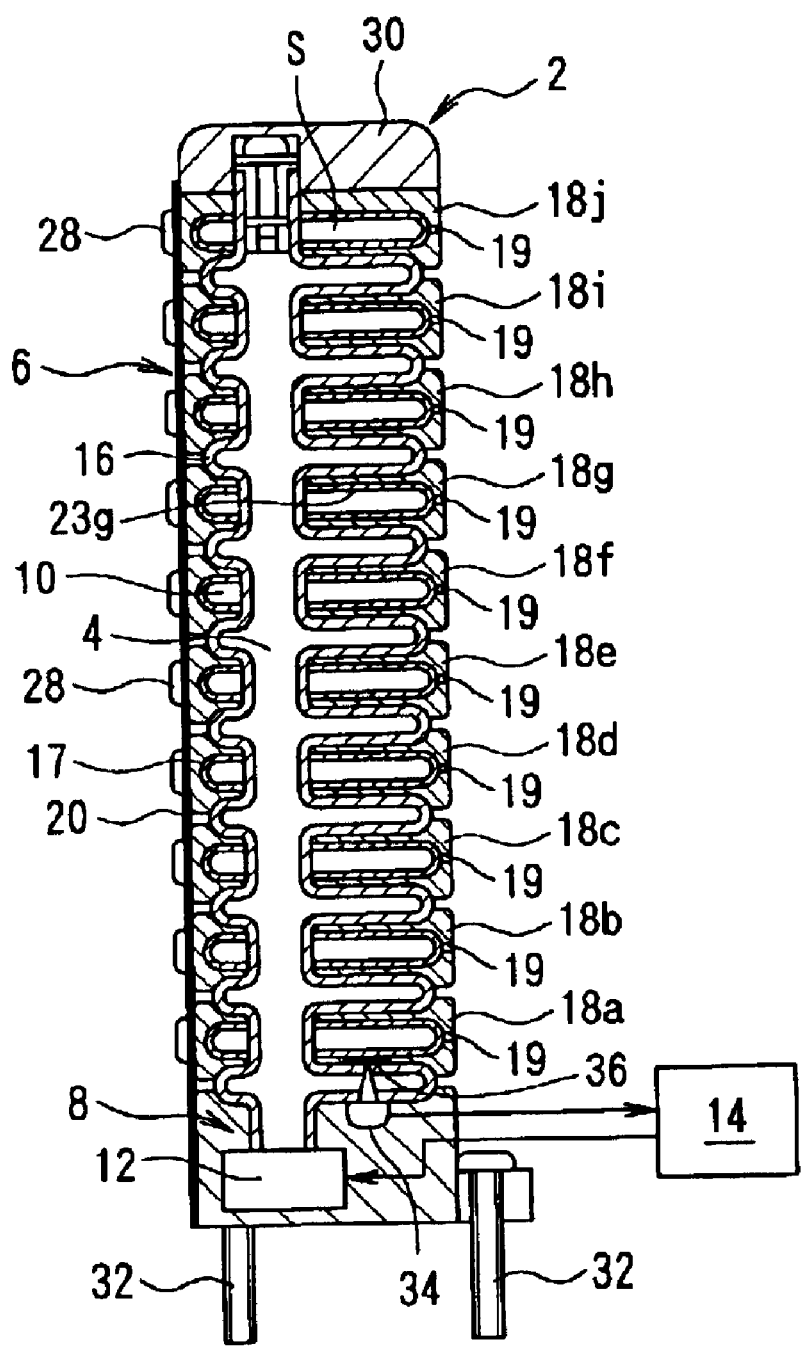
FIG. 11 is a view taken along line XI—XI in FIG. 9 as seen in the direction of the arrow.
Figure 12:
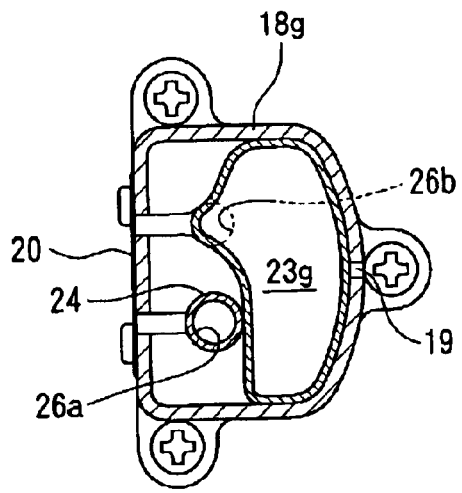
FIG. 12 is a view taken along line XII—XII in FIG. 9 as seen in the direction of the arrow.

As shown in FIGS. 9 and 11, the flexible actuator 2 according to this embodiment includes a long movable part 6 that is bent by a liquid moving toward a main liquid chamber 4, an actuator body 8 integral with a base of the movable part 6, a reservoir 10 where a liquid moves to and from the main liquid chamber 4, a pump 12 that moves the liquid between the reservoir 10 and the main liquid chamber 4, and a pump driving unit 14 that controls the pump 12. The actuator body 8 is a root of the robot finger and secured to a hand of the unshown robot.

The movable part 6 includes a long first tube 16 that forms the main liquid chamber 4, a long second tube 17 that is placed along the first tube 16 and forms the reservoir 10, a plurality of frame members 18a, 18b . . . aligned at regular intervals along lengths of the first tube 16 and the second tube 17, and a core member 20 that holds the alignment of the frame members 18a, 18b . . . .

Figure 13:
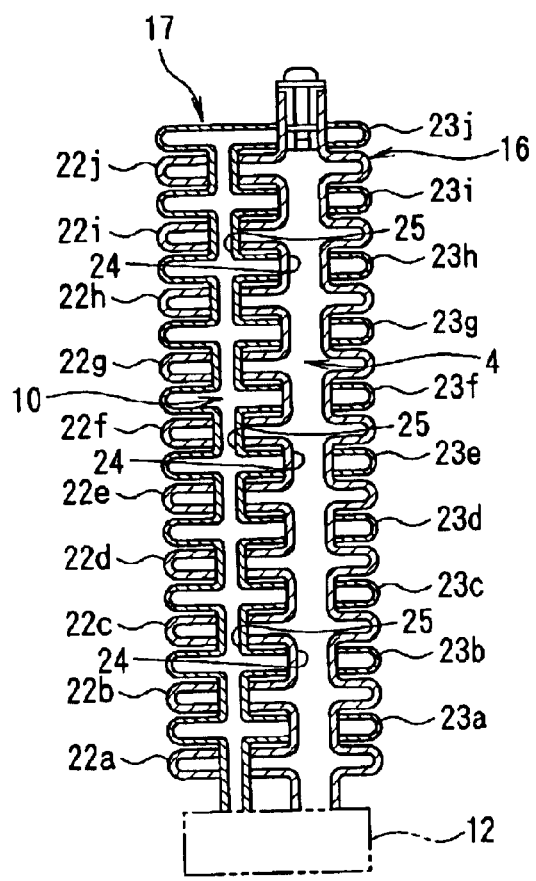
FIG. 13 shows a first tube and a second tube that configure the flexible actuator according to the third embodiment.

The first tube 16 that forms the main liquid chamber 4 is made of an expandable and shrinkable elastic material of synthetic resin. FIG. 13 shows shapes of the first tube 16 and the second tube 17 seen from a side of the core member 20, and the first tube 16 has a fernlike appearance in which a narrow hollow portion 24 communicates between flat expanded hollow portions 22a, 22b . . . provided at predetermined intervals along the length.

The second tube 17 that forms the reservoir 10 is made of an expandable and shrinkable elastic material of synthetic resin thinner than that of the first tube 16, and has a fernlike appearance in which a narrow hollow portion 25 communicates between flat expanded hollow portions 23a, 23b . . . provided at predetermined intervals along the length.

The expanded hollow portions 23a, 23b . . . of the second tube 17 are placed to longitudinally overlap the expanded hollow portions 22a, 22b of the first tube 16.

The plurality of frame members 18a, 18b are substantially rectangular on plane view and have cavities therein, and each of the frame members 18a, 18b . . . has an air hole 19 that communicates between the cavity and an outside. A frame member 18g in FIG. 12 has two recesses 26a, 26b provided on a side abutting the core member 20, with the narrow hollow portion 24 of the first tube 16 being inserted into one recess 26a, and is vertically held between expanded hollow portions 22g, 22h . . . of the first tube 16. The frame members other than the frame member 18g also have a recess 26a, with the narrow hollow portion 24 of the first tube 16 being inserted into the recess 26a, and is vertically held between the expanded hollow portions of the first tube 16.

The narrow hollow portion 25 of the second tube 17 is inserted into another recess 26b provided on the frame member 18g in FIG. 12, and an expanded hollow portion 23g of the second tube 17 that expands near the narrow hollow portion 25 is placed in the cavity of the frame member 18g.

The expanded hollow portions of the second tube 17 other than the expanded hollow portion 23g are also placed in the cavities of other frame members. On a frame member 18j at the top, a cap 30 is placed also as shown in FIG. 1.

The actuator body 8 is secured to the hand of the robot by securing screws 32. The pump 12 built in the actuator body 8 uses, for example, a piezo type diaphragm pump, and connects to a bottom opening of the first tube 16 that forms the main liquid chamber 4 and a bottom end of the second tube 17 that forms the reservoir 10 storing a predetermined amount of hydraulic fluid S such as liquid silicone. The pump 12 supplies the hydraulic fluid S in the reservoir 10 to the main liquid chamber 4, or returns the hydraulic fluid S in the main liquid chamber 4 to the reservoir 10 by controlling the pump driving unit 14.

The actuator body 8 includes a light receiving and emitting unit 34 having a light emitting element such as a light emitting diode and a light receiving element such as a photodiode. A reflection unit 36 such as a mirror is provided on a lower surface of the frame member 18a at the bottom facing the light receiving and emitting unit 34 via the expanded hollow portion 22a of the first tube 16. The light receiving and emitting unit 34 sends detected information on an amount of emitted light (an amount of received light) toward (from) the reflection unit 36 to the pump driving unit 14 as required.

The pump driving unit 14 includes an input interface circuit for reading a detected signal from the light receiving and emitting unit 34, a processing unit that performs predetermined processing for controlling the pump 12 according to a predetermined program, a storage unit such as a RAM or a ROM, and an output interface circuit that outputs a voltage control signal to a piezo element of the piezo type diaphragm pump obtained by the processing unit. The storage unit stores an amount of displacement of the movable part 6 corresponding to a relationship between hydraulic pressure of the main liquid chamber 4 and the amount of received light input from the light receiving and emitting unit 34 as a storage table.

The processing unit performs the predetermined processing for controlling the pump 12 with reference to the storage table.

Figure 14:
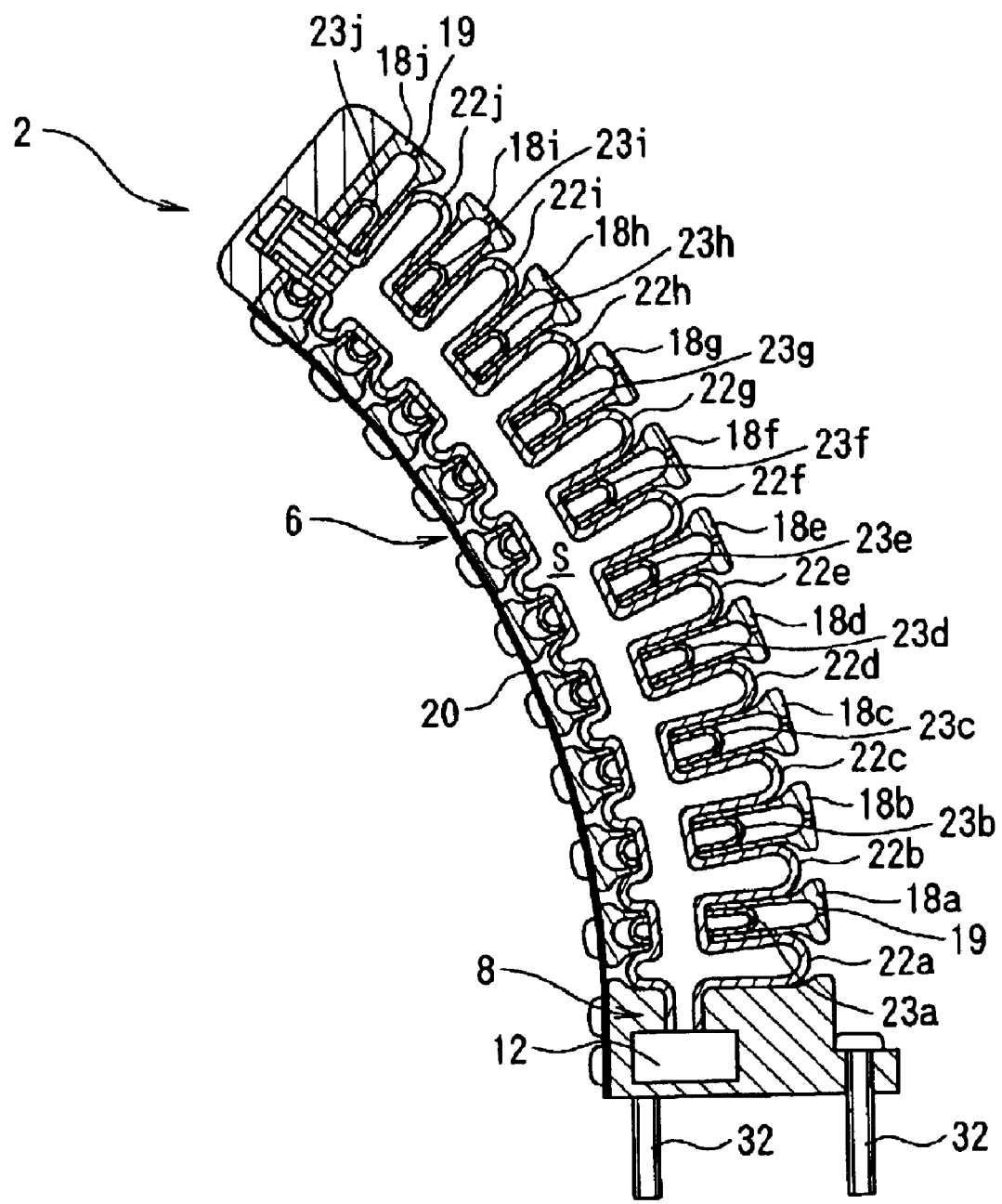
FIG. 14 shows the flexible actuator according to the third embodiment being bent.

Next, operations of the flexible actuator 2 having the above described configuration will be described with reference to FIGS. 14 and 11.

A control current is output from the pump driving unit 14 to the pump 12. When the pump 12 supplies the hydraulic fluid S in the reservoir 10 to the main liquid chamber 4, the hydraulic fluid S flows into the expanded hollow portions 22a, 22b . . . of the first tube 16 to increase their capacities.

The expanded hollow portions 22a, 22b . . . with the increased capacities by the hydraulic fluid S flowing into the main liquid chamber 4 bend the core member 20 to displace the frame members 18a, 18b . . . and to bend the entire movable part 6 with a predetermined curvature. At this time, the expanded hollow portions 23a, 23b . . . of the second tube 17a placed in the cavities of the frame members 18a, 18b . . . , respectively are shrunk.

On the other hand, the pump 12 returns the hydraulic fluid S in the main liquid chamber 4 to the reservoir 10, the capacities of the expanded hollow portions 22a, 22b . . . of the first tube 16 decrease to return the frame members 18a, 18b . . . to their original positions by resilience of the core member 20. This brings the movable part 6 into an upright condition as shown in FIG. 11.

As the capacities of the expanded hollow portions 22a, 22b . . . of the first tube 16 decrease, the expanded hollow portions 23a, 23b of the second tube 17 expand into the cavities of the frame members 18a, 18b . . . . However, each of the frame members 18a, 18b . . . has the air hole 19 that communicates between the cavity and the outside to prevent air compression in the cavity, thus allowing expansion of the expanded hollow portions 23a, 23b of the second tube 17.

Therefore, according to the flexible actuator 2 of this embodiment, the expanded hollow portions 22a, 22b of the first tube 16 and the expanded hollow portions 23a, 23b . . . of the second tube 17 are placed to longitudinally overlap each other, and the pump 12 is built in the actuator body 8 integral with the base of the movable part 6, thus providing a small actuator.

The first tube 16 that forms the main liquid chamber 4 and the second tube 17 that forms the reservoir 10 are placed along each other in the movable part 6. Even if a position of the movable part 6 changes, either the main liquid chamber 4 or the reservoir 10 is not positioned above or below the other. Further, the main liquid chamber 4 and the reservoir 10 are placed close to each other, so that the amounts of hydraulic fluid S supplied and discharged to and from the main liquid chamber 4 by gravity do not change. Therefore, the change in the position of the movable part 6 causes no change in an amount of bending displacement of the pump driving unit 14.

The second tube 17 that forms the reservoir 10 includes the flat expanded hollow portions 23a, 23b provided at the predetermined intervals along the length, and the narrow hollow portion 25 communicates between the expanded hollow portions. This allows the second tube 17 per se to serve as a plurality of reservoirs connected by a tube, thus providing a simple and inexpensive actuator.

When the expanded hollow portions 23a, 23b . . . of the second tube 17 expand into the cavities of the frame members 18a, 18b . . . , the air in the cavities passes through the air holes 19 to the outside and thus exerts no influence on expansion of the expanded hollow portions 23a, 23b . . . .

Further, the second tube 17 is made of the thin elastic material, thus allowing spaces in the cavities of the frame members 18a, 18b . . . to be effectively used as the expanded hollow portions 23a, 23b to provide a small actuator.

Figure 15:
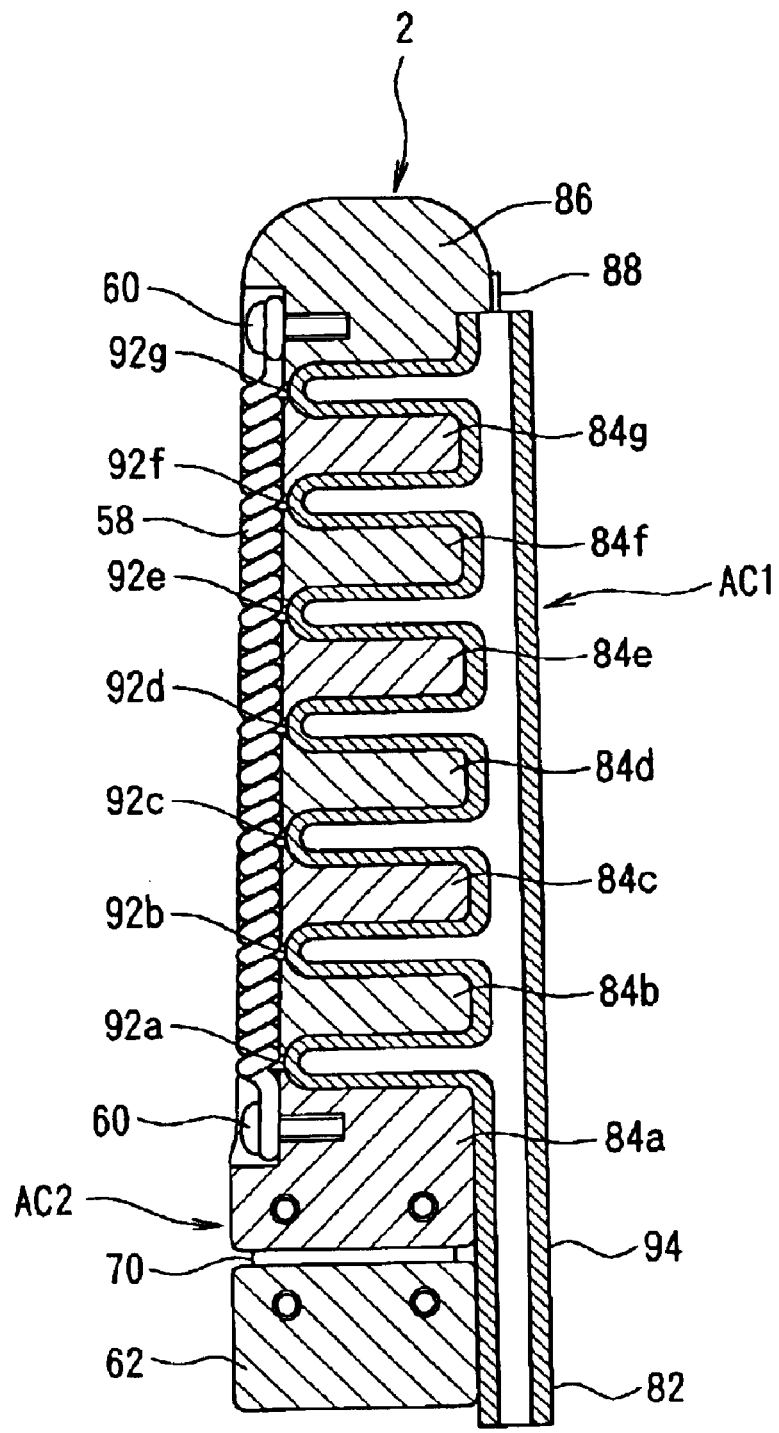
FIG. 15 is a sectional view of a flexible actuator used as a robot finger according to a fourth embodiment of the invention.
Figure 16:
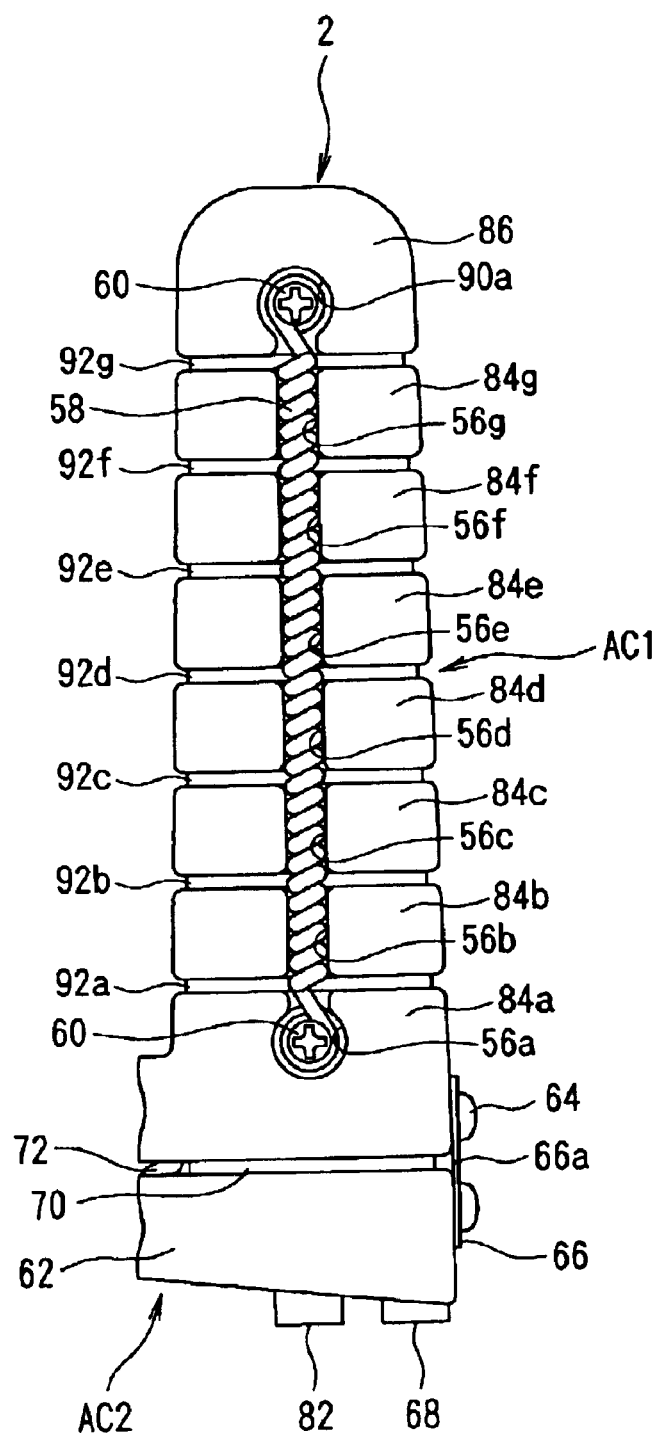
FIG. 16 is a back view of the flexible actuator according to the fourth embodiment.
Figure 17:
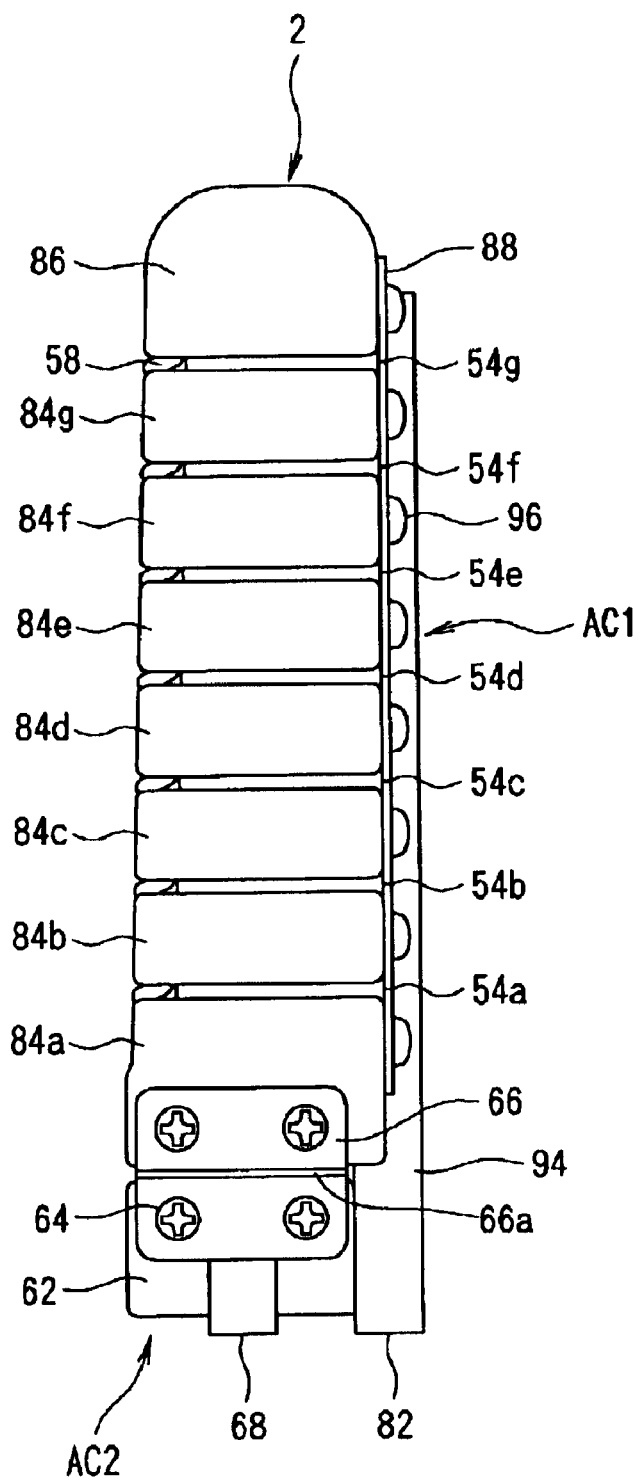
FIG. 17 is a side view of the flexible actuator according to the fourth embodiment.

Next, FIG. 15 is a sectional view of a flexible actuator 2 used as a robot finger of a robot according to a fourth embodiment, FIG. 16 is a back view of the flexible actuator 2, and FIG. 17 is a side view of the flexible actuator 2.

The flexible actuator 2 according to this embodiment includes a first actuator AC1 and a second actuator AC2 joined to a base of the first actuator AC1.

The first actuator AC1 includes a tube 82 that forms a liquid chamber, a plurality of frame members 84a, 84b . . . and a tip frame member 86 provided at predetermined intervals along a length of the tube 82, and a connection member 88 that holds the adjacent frame members 84a, 84b . . . and the tip frame member 86 so as to swing against each other.

As shown in FIG. 15, the tube 82 is made of a flexible elastic material of synthetic resin, and includes flat expanded hollow portions 92a, 92b . . . provided at predetermined intervals along the length, and a connection tube 94 that communicates between the expanded hollow portions 92a, 92b . . . , and the connection tube 94 is provided at edges of the expanded hollow portions 92a, 92b . . . .

The plurality of frame members 84a, 84b . . . and the tip frame member 86 are substantially rectangular members on plane view made of synthetic resin, and an upper surface of the frame member 84a at the base, upper and lower surfaces of the frame members 84b, 84c . . . , and an upper surface of the tip frame member 86 are flat. The upper surface of the frame member 84a, the upper and lower surfaces of the frame members 84b, 84c . . . , and a lower surface of the tip frame member 86 are held with the flat portions in surface contact with the expanded hollow portions 92a, 92b . . . of the tube 82.

The connection tube 94 of the tube 82 extends along the length apart from the expanded hollow portions 92a, 92b . . . and the frame members 84a, 84b . . . placed in surface contact with each other, and is held between two connection members 88.

As shown in FIG. 17, the two connection members 88 are elastic deformable plate members made of synthetic resin, and vertically secure the frame members 84a, 84b . . . and the tip frame member 86 with spaces therebetween using a plurality of screws 96. Each connection member 88 has thin portions between the frame members to form hinges 54a, 54b . . . for holding the frame members so as to swing against each other.

As shown in FIG. 16, guide grooves (guide portions) 56a, 56b . . . , 90a are formed on surfaces facing the hinges 54a, 54b of the frame members 84a, 84b and the tip frame member 86, and the guide grooves 56a, 56b . . . , 90a accommodate a spring member 58.

Both ends of the spring member 58 are secured to the frame member 84a and the tip frame member 86 by screws 60 to produce a spring force in a compressing direction of the expanded hollow portions 92a, 92b . . . of the tube 82.

On the other hand, as shown in FIGS. 16 and 17, the second actuator AC2 includes a connection member 66 that secures the frame member 84a at the base and a base frame member (an actuator mounting portion) 62 by screws 64 with a predetermine space therebetween, an expanded hollow portion 70 of the tube 68 held between the flat lower surface of the frame member 84a at the base and the upper surface of the base frame member 62, and a spring member 72 that is secured at its both ends to the frame member 84a at the base and the base frame member 62 by unshown screws and produces a spring force in a compressing direction of the expanded hollow portion 70 of the tube 68. The expanded hollow portion 70 is set to expand toward a side without the connection member 88 and the spring member 58 of the first actuator AC1. A central portion of the connection member 66 that secures the frame member 84a at the base and the base frame member 62 has a thin portion to form a hinge 66a for holding both frame members so as to swing against each other like the connection member 88.

Figure 18:
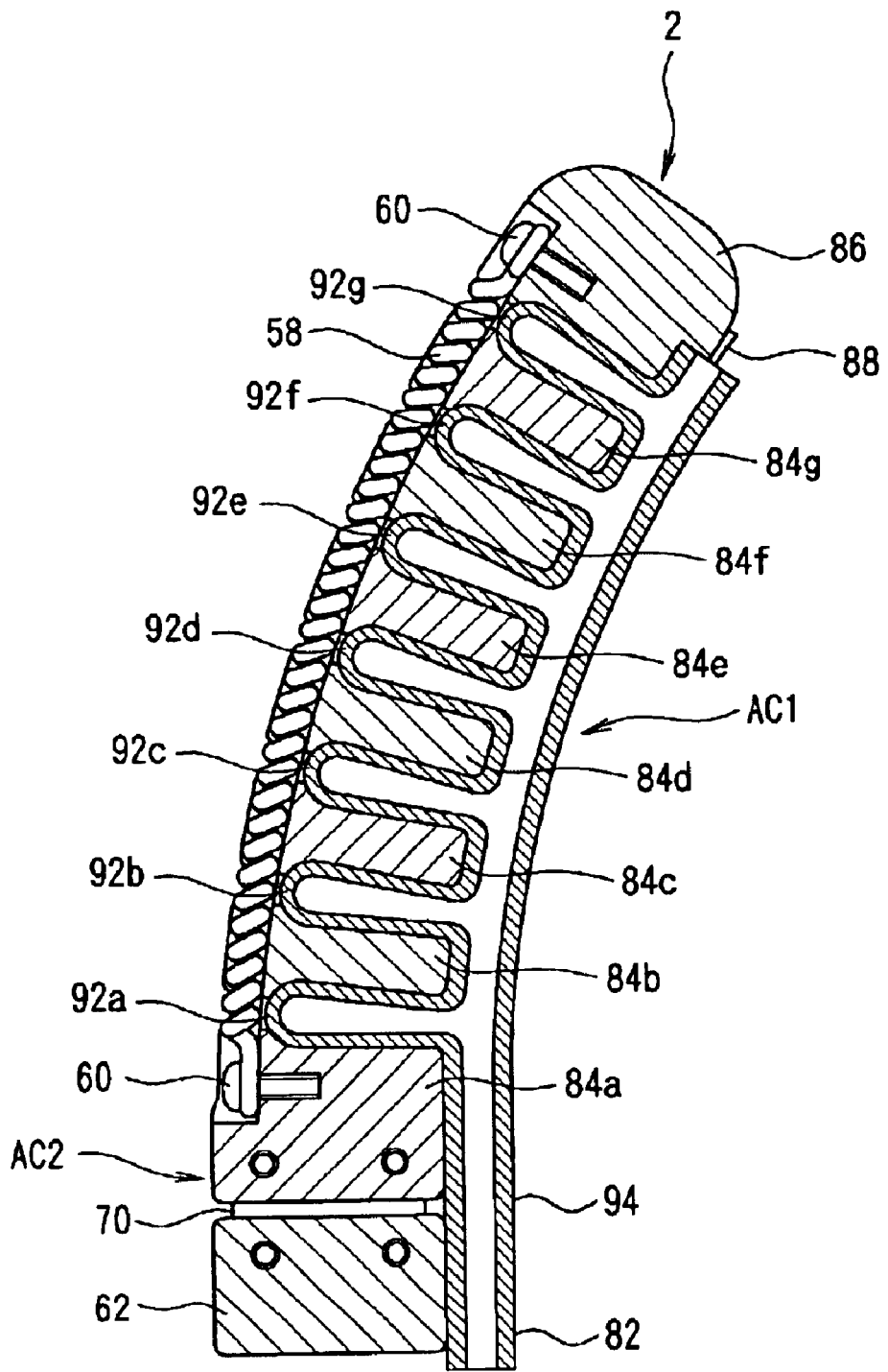
FIG. 18 shows the flexible actuator according to the fourth embodiment being bent.
Figure 19:
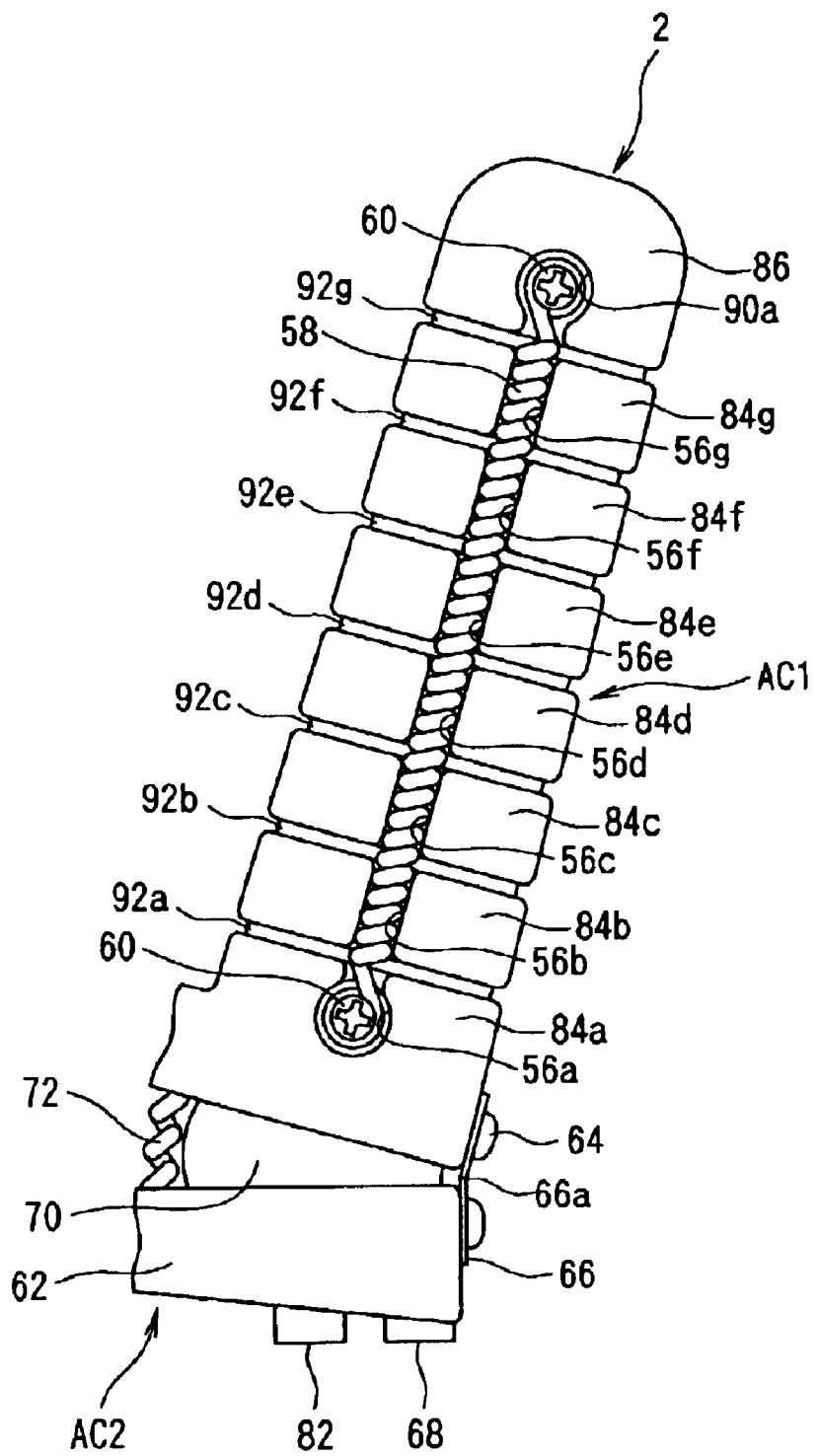
FIG. 19 is a back view of the flexible actuator according to the fourth embodiment with a direction thereof changed.

Next, operations and advantages of the above described flexible actuator 2 according to the fourth embodiment will be described with reference to FIGS. 18 and 19. An unshown fluid supply control unit connects to bottom openings of the tube 82 that forms the first actuator AC1 and the tube 68 that forms the second actuator AC2, and the fluid supply control unit supplies and returns the fluid to and from the liquid chamber in the tubes 82, 68.

When the fluid supply control unit supplies the fluid to the tube 82, the expanded hollow portions 92a, 92b of the tube 82 increases their capacities by the fluid flowing therein. The expanded hollow portions 92a, 92b . . . with the increased capacities, that is, expanded by the fluid flowing therein bend the hinges 54a, 54b . . . of the connection member 88 to displace the frame members 84b, 84c . . . and the tip frame member 86. At this time, the expanded hollow portions 92a, 92b . . . are held between the frame members 84a, 84b . . . and the tip frame member 86 with large contact areas, so that the expanded hollow portions 92a, 92b expand such that a force to bend the hinges 54a, 54b . . . increases to deeply bend the first actuator AC1 as shown in FIG. 18.

When the fluid supply control unit returns the fluid from the tube 82, the spring member 58 produces the spring force in the compressing direction of the expanded hollow portions 92a, 92b . . . , thus resilience of the spring member 58 brings the first actuator AC1 into its original upright condition.

When the fluid supply control unit supplies the fluid into the tube 68, the expanded hollow portion 70 of the tube 68 increases its capacity by the fluid flowing therein. The expanded hollow portion 70 with the increased capacity, that is, expanded by the fluid flowing into the tube 68 bends the hinge 66a of the connection member 66 to displace the frame member 84a from a direction different from the bending direction of the first actuator AC1, and slant the entire first actuator AC1.

When the fluid supply control unit returns the fluid from the tube 68, the spring member 72 produces the spring force in the compressing direction of the expanded hollow portion 70, thus resilience of the spring member 72 returns the slanted entire first actuator AC1 to its original condition.

Therefore, the flexible actuator 2 according to this embodiment can freely adjust the resilience simply by selecting the spring member 58 of the first actuator AC1, thus repulsion of the spring member does not limit bending.

The spring member 58 of the first actuator AC1 is secured only at the both ends, and the spring member 58 absorbs any partially deep bending condition of a hinge in its entire extension to prevent partially excessive extension, thus increasing durability.

The guide grooves 56a, 56b . . . , 90a of the frame members 84a, 84b . . . and the tip frame member 86 accommodate the spring member 58, thus preventing the position of the spring member 58 from being shifted in bending the first actuator AC1.

When the flexible actuator 2 according to this embodiment is used as the robot finger of the robot, the first actuator AC1 bends deeply like a human finger to ensure enclosing to grip a soft object such as a fruit or a paper cup. Further, the first actuator AC1 that bends in a predetermined direction, and the second actuator AC2 that slants the entire first actuator AC1 in the direction different from the bending direction of the first actuator AC1 are provided, thus allowing the position of the tip frame member 86 corresponding to the finger tip of the robot to be changed to precisely grip a small object.

Figure 20:
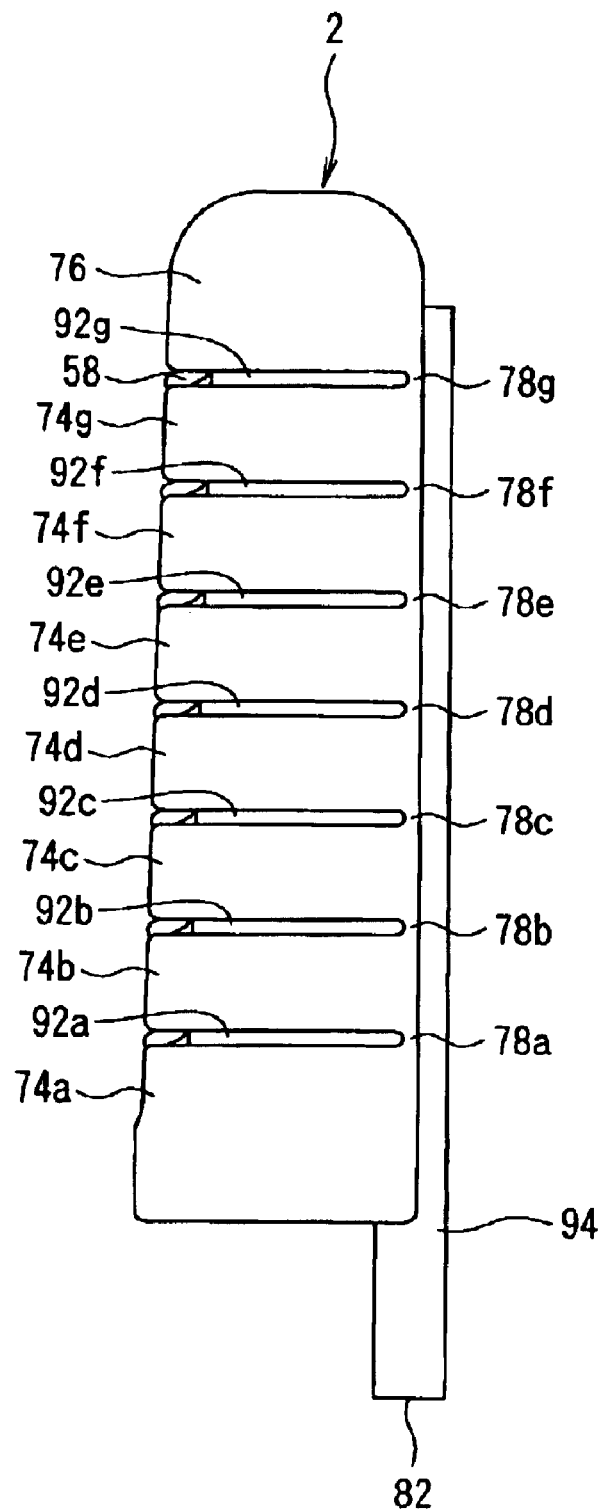
FIG. 20 is a side view of a flexible actuator used as a robot finger according to a fifth embodiment of the invention.
Figure 21:
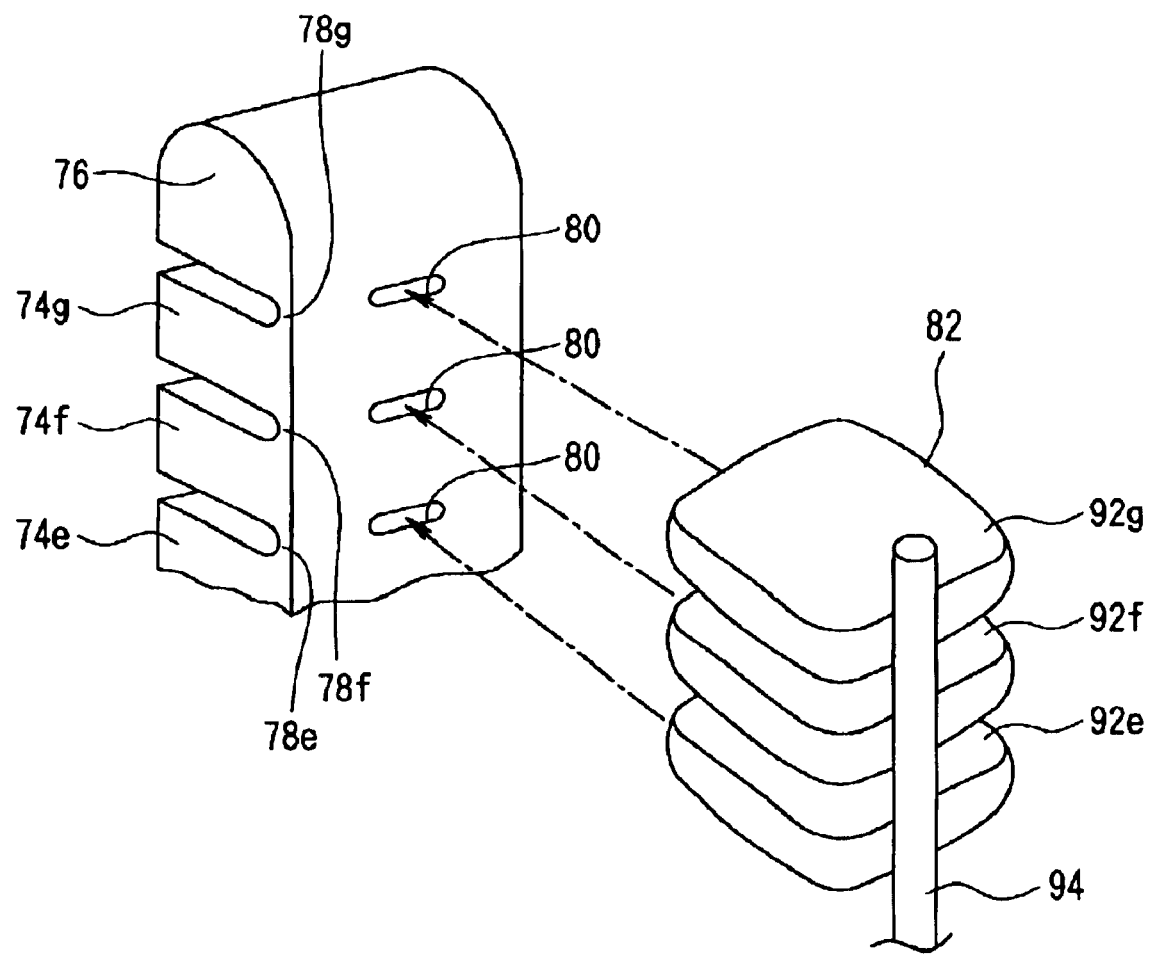
FIG. 21 shows frame members and a connection member that configure the flexible actuator according to the fifth embodiment being integrally molded.

Next, a flexible actuator according to a fifth embodiment of this embodiment will be described with reference to FIGS. 20 and 21. Like components as in the fourth embodiment are denoted by like reference numerals, and descriptions thereof will be omitted.

The flexible actuator 2 of this embodiment includes a tube 82 that forms a liquid chamber, a plurality of frame members 74a, 74b . . . and a tip frame member 76 aligned at predetermined intervals along a length of the tube 82, and connections 78a, 78b . . . that hold the adjacent frame members 74a, 74b . . . and the tip frame member 76 so as to swing against each other.

The frame members 74a, 74b . . . and the tip frame member 76, and the connections 78a, 78b . . . are integrally molded of a bending-resistant resin material such as polypropylene, and the connections 78a, 78b are thin to form hinges.

A surface facing a spring member 58 of each of the connections 78a, 78b . . . has slots 80.

When assembling the flexible actuator 2 of this embodiment, expanded hollow portions 92a, 92b . . . of the tube 82 are simply passed through the slots 80 of the connection 78a, 78b . . . to be placed on sides of the frame members 74a, 74b. The expanded hollow portions 92a, 92b of the tube 82 are flexible and thin, thus can be easily deformed to be passed through the elongate slots 80 as shown. Operations of this embodiment are similar to those of the fourth embodiment.

This embodiment achieves similar advantages as those of the first actuator AC1 in the fourth embodiment, and the frame members 74a, 74b . . . and the tip frame member 76, and the connections 78a, 78b . . . are integrally molded of the resin material, thus providing a flexible actuator that includes a small number of components, has a reduced weight, and is easy to assemble.

In the fourth and fifth embodiments, the frame members 84a, 84b . . . , 74a, 74b . . . , and the tip frame members 86, 76 have the guide grooves 56a, 56b . . . , 90a. However, if the spring member is not shifted in bending, the frame members 84a, 84b . . . and the tip frame members 86, 76 may have guide holes communicating with each other instead of the guide grooves, and the holes may accommodate the spring member 58.

The flexible actuators according to the first to fifth embodiments can be used as an actuator for a pet robot that finely acts like an animal. The actuator is compact even when used as the pet robot, thus providing the pet robot that finely acts like an animal.

An actuator that operates as a robot finger of a robot must bend like a human finger, and enclose to grip a soft object such as a fruit or a paper cup, pinch a small object such as a screw with its tip, or bend to push a switch with its tip. In gripping the paper cup with the entire robot finger, a substantially even bending force is desirably produced throughout the finger, but in pinching the object with the tip, a bending force proportional to a distance from the tip is desirably produced in terms of moment.

However, in the prior art, the actuator entirely bends with a predetermined curvature to grip the object, and do not have a structure in which an appropriate bending force is produced at each part. Thus, it is difficult to configure an actuator capable of performing various operations such as enclosing to grip the soft object, pinching the small object, or pushing the switch with the tip, with appropriate gripping forces like the human finger.

Compared to the prior art, in the flexible actuator according to the invention, the expanded hollow portion placed in the first bending portion of the movable part has the large transverse cross sectional area, and the expanded hollow portion placed in the second bending portion has the small transverse cross sectional area, so that the first bending portion produces the large bending force and the second bending portion produces the small bending force simply by the fluid flowing into the tube to increase the capacities of the expanded hollow portions. This allows gripping the paper cup with the substantially even bending force throughout the finger, and pinching the object with the tip like the human finger tip by the base producing the large bending force and the tip producing the small bending force.

Further, for the flexible actuator in which the main liquid chamber with the movable part that is bent by the liquid flowing therein, and the reservoir where the liquid moves to and from the main liquid chamber are placed along the length, even if the position of the movable part changes, the amount of fluid supplied from the reservoir to the main liquid chamber, and the amount of fluid discharged from the main liquid chamber to the reservoir by gravity do not change. Therefore, the change in the position of the movable part causes no change in the amount of bending deformation.

What is claimed is:

1. A flexible actuator comprising:
a long movable part that is bent by a liquid moving toward a main liquid chamber;
a reservoir where the liquid moves to and from said main liquid chamber;
a pump that moves the liquid between the reservoir and said main liquid chamber; and
a pump driving unit that controls the pump,
wherein said movable part includes a long tube that forms said main liquid chamber, a plurality of frame members aligned at predetermined intervals along a length of the tube, and a resilient core member that holds the alignment of the frame members, said tube is made of a flexible elastic material, and includes a plurality of flat expanded hollow portions provided at predetermined intervals along the length and a narrow hollow portion that communicates between the expanded hollow portions, said plurality of frame members are formed by flat members and longitudinally hold said plurality of expanded hollow portions by the narrow hollow portion of said tube inserted into recesses or holes provided on sides abutting said core member, said movable part has a first bending portion that produces a large bending force and a second bending portion that produces a small bending force, said expanded hollow portion placed in said first bending portion has a large transverse cross sectional area, and said expanded hollow portion placed in said second bending portion has a small transverse cross sectional area.

2. The flexible actuator according to claim 1, wherein the flexible actuator is used as a robot finger, and said expanded hollow portion at a base of said movable part as said first bending portion has a largest transverse cross sectional area, with transverse cross sectional areas of said expanded hollow portions gradually decreasing toward a tip of said movable part, and said expanded hollow portion at the tip of said movable part as said second bending portion has a smallest transverse cross sectional area.

3. The flexible actuator according to claim 2, wherein the transverse cross sectional area of said expanded hollow portion placed in said second bending portion is 30% to 80% of the transverse cross sectional area of said expanded hollow portion placed in said first bending portion.

4. The flexible actuator according to claim 2, wherein said core member is a member having gradually decreasing resilience from the base toward the tip of said movable part.

5. The flexible actuator according to claim 4, wherein said core member is a tapered plate material in which a base has a large width, with widths gradually decreasing toward a tip, and the tip has a smallest width.

6. The flexible actuator according to claim 1, wherein the flexible actuator is used as an actuator for massaging a shoulder, and said expanded hollow portion at a center along a length of said movable part as said first bending portion has a largest transverse cross sectional area, with transverse cross sectional areas of said expanded hollow portions gradually decreasing toward both ends along the length of said movable part, and said expanded hollow portions at the both ends of said movable part as said second bending portion have a smallest transverse cross sectional area.

7. The flexible actuator according to claim 6, wherein the transverse cross sectional area of said expanded hollow portion placed in said second bending portion is approximately 60% of the transverse cross sectional area of said expanded hollow portion placed in said first bending portion.

8. The flexible actuator according to claim 6, wherein said core member is a member having gradually decreasing resilience from the center along the length toward the both ends of said movable part.

9. The flexible actuator according to claim 8, wherein said core member is a plate material in which a center along a length has a large width, with widths gradually decreasing toward both ends, and the both ends have a smallest width.

10. The flexible actuator according to claim 1, wherein said reservoir and said pump are built in an actuator body integral with an end of said movable part.

11. The flexible actuator according to claim 1, wherein a sensor that detects the amount of moving fluid is placed in any of said pump, said main liquid chamber, or said reservoir, and said pump driving unit controls said pump based on information from said sensor.

12. A flexible actuator comprising:
a long movable part that is bent by a liquid moving toward a main liquid chamber;
a reservoir where the liquid moves to and from said main liquid chamber;
a pump that moves the liquid between the reservoir and said main liquid chamber; and
a pump driving unit that controls the pump,
wherein said movable part includes said main liquid chamber and said reservoir placed along a length, a plurality of frame members aligned at predetermined intervals along lengths of said main liquid chamber and said reservoir, and a resilient core member that holds the alignment of the frame members.

13. The flexible actuator according to claim 12, wherein said reservoir is formed by a tube made of an expandable and shrinkable elastic material, and includes a plurality of flat expanded hollow portions provided at predetermined intervals along the length, and an arrow hollow portion that communicates between the expanded hollow portions.

14. The flexible actuator according to claim 13, wherein said main liquid chamber is formed by a tube made of an expandable and shrinkable elastic material, and includes a plurality of flat expanded hollow portions provided at predetermined intervals along the length, and a narrow hollow portion that communicates between the expanded hollow portions, and each expanded hollow portion of said main liquid chamber is placed to longitudinally overlap each expanded hollow portion of said reservoir.

15. The flexible actuator according to claim 13, wherein said plurality of frame members are hollow members with cavities therein, and each expanded hollow portions of said reservoir is placed in each cavity of said plurality of frame members.

16. The flexible actuator according to claim 13, wherein the tube that forms said reservoir is made of a flexible elastic material such that each expanded hollow portion of the tube can expand into the entire cavity.

17. The flexible actuator according to claim 15, wherein said plurality of frame members include air holes that communicates between said cavities and an outside.

18. A flexible actuator comprising:
a plurality of flat expanded hollow portions made of a flexible elastic material and provided at predetermined intervals along a length;
a long tube in which a liquid chamber is formed by a connection tube that communicates between the plurality of expanded hollow portions and extends along the length;
a plurality of flat frame members that longitudinally hold the plurality of expanded hollow portions of said tube with surface contact; and
a connection that holds said adjacent frame members so as to swing against each other,
wherein said actuator includes at least one spring member for recovering rotating angle between said frame members, and said spring member is placed to produce a spring force in a compressing direction of the expanded hollow portions of said tube by said adjacent frame members.

19. The flexible actuator according to claim 18, wherein ends of said spring member are secured to both ends of said aligned frame members.

20. The flexible actuator according to claim 19, wherein each of said frame members includes a guide that guides extension and shrinkage of said spring member.

21. The flexible actuator according to claim 18, wherein said frame members and said connection are integrally molded of resin.

22. A flexible actuator comprising:
a first actuator that bends in a predetermined direction; and
a second actuator joined to a base of the first actuator,
wherein said first actuator includes: a plurality of flat expanded hollow portions made of a flexible elastic material and provided at predetermined intervals along a length; a long tube in which a liquid chamber is formed by a connection tube that communicates between the plurality of expanded hollow portions and extends along the length; a plurality of flat frame members that longitudinally hold the plurality of expanded hollow portions of said tube with surface contact; and a connection that holds said adjacent frame members so as to swing against each other, and said second actuator is placed between said frame member at the base of said first actuator and an actuator mounting portion, and the entire first actuator is slanted in a direction different from a bending direction of said first actuator.

23. The flexible actuator according to claim 22, wherein said first actuator includes at least one spring member for recovering rotating angle between said frame members, and the spring member is placed to produce a spring force in a compressing direction of the expanded hollow portions of said tube by said adjacent frame members.

* * * * *